US009787617B2

(12) United States Patent
Ciavatta

(10) Patent No.: US 9,787,617 B2
(45) Date of Patent: *Oct. 10, 2017

(54) METHOD AND SYSTEM FOR ESTABLISHING A COMMUNICATION BETWEEN MOBILE COMPUTING DEVICES

(71) Applicant: QUZZUP SRL, Dogana (SM)

(72) Inventor: Aldo Ciavatta, Dogana (SM)

(73) Assignee: QUZZUP SRL, Dogana (SM)

( * ) Notice: Subject to any disclaimer, the term of this patent is extended or adjusted under 35 U.S.C. 154(b) by 0 days.

This patent is subject to a terminal disclaimer.

(21) Appl. No.: 15/286,417

(22) Filed: Oct. 5, 2016

(65) Prior Publication Data

US 2017/0026321 A1    Jan. 26, 2017

Related U.S. Application Data

(63) Continuation-in-part of application No. 14/917,253, filed as application No. PCT/IB2014/064073 on Aug. 26, 2014, now Pat. No. 9,589,218.

(30) Foreign Application Priority Data

Sep. 5, 2013   (IT) .............................. MI2013A1455

(51) Int. Cl.
   *G06K 7/10*     (2006.01)
   *H04L 12/58*    (2006.01)

(52) U.S. Cl.
   CPC .............. *H04L 51/08* (2013.01); *H04L 51/04* (2013.01)

(58) Field of Classification Search
   CPC .. G06K 7/10; G06K 9/36; G06K 9/80; G06K 9/18; G06K 7/14; G06K 19/00; G08C 21/00; G06F 17/00
   USPC ............ 235/462.1, 462.01, 462.07, 375, 487
   See application file for complete search history.

(56) References Cited

U.S. PATENT DOCUMENTS

| | | | |
|---|---|---|---|
| 2007/0124414 A1 | 5/2007 | Bedingfield et al. | |
| 2011/0004690 A1* | 1/2011 | Georgel | G06F 17/30899 709/227 |
| 2011/0101086 A1* | 5/2011 | Yach | G06Q 10/10 235/375 |
| 2011/0283196 A1 | 11/2011 | Berger et al. | |
| 2012/0036226 A1* | 2/2012 | Chor | G06F 17/30879 709/219 |
| 2012/0061458 A1* | 3/2012 | Bahr | G06K 7/10792 235/375 |
| 2012/0239618 A1* | 9/2012 | Kung | G06F 21/6218 707/621 |
| 2014/0364092 A1* | 12/2014 | Rose | G06F 17/30887 455/414.1 |

OTHER PUBLICATIONS

Shannon, Scott, "Using QR Codes and Google Analytics to Track Mobile Devices," pp. 1-3, Mar. 7, 2011.

(Continued)

*Primary Examiner* — Edwyn Labaze

(74) *Attorney, Agent, or Firm* — Marshall, Gerstein & Borun LLP

(57) ABSTRACT

Method and system for initiating and establishing a communication between mobile computing devices, in particular initiating and establishing an online exchange of messages in real time, i.e. instant messaging, with one or more simultaneous users of a computer network.

25 Claims, 14 Drawing Sheets

(56) References Cited

OTHER PUBLICATIONS

"URL Generator—Create a list of URL's based on the field values you enter," pp. 1-4, Jun. 20, 2003.
Search Report and Written Opinion for PCT/IB2014/064073, mailed Oct. 22, 2014.
International Preliminary Report on Patentability for PCT/IB2014/064073, mailed Nov. 3, 2015.

* cited by examiner

READING QR CODES (Valid for information use)
(Guest)

READING/EDITING QR CODES (Valid for Sensitive data)
(Operators/users)

METHOD AND SYSTEM FOR ESTABLISHING A COMMUNICATION BETWEEN MOBILE COMPUTING DEVICES

FIELD OF THE INVENTION

The present disclosure relates to a method and apparatus for the remote supply, display and/or presentation of dynamic informative contents by generating a QR code with a dynamic content. In particular, embodiments relate to the field of processing data and receiving dynamic, text or multimedia information, through a computer or telecommunication network, by scanning a QR code shown in a real environment.

The present disclosure further relates to communication applications, and specifically to a method and system for initiating and establishing a communication between mobile computing devices, in particular initiating and establishing an online exchange of messages in real time, i.e. instant messaging, with one or more simultaneous users of a computer network, e.g. a so-called chat.

BACKGROUND OF THE INVENTION

One-dimensional (1-D) and two-dimensional (2-D) bar codes are known, which are formed by a specific set of symbols. In particular, two-dimensional codes provide the capacity of storing large quantities of information compared with one-dimensional bar codes. Among 2-D bar codes QR codes are very common on the market, also because of the massive diffusion of portable smartphones or suchlike, such as tablets and phablets.

QR codes are typically used, as well as for tracing objects, also for providing complex multimedia contents by suitable applications for users. QR codes can be used to show a text to a user, to add contact information to a user's telephone, to open a webpage or compose a text message or an email. A user can also generate and print autonomously his/her own QR code encoding determinate information and can post it at various real environments and also virtually on webpages. Often, QR codes are used to store network or telecommunication addresses, such as for example in links to a particular URL resource on the Internet, or other network addresses.

Furthermore, QR codes can appear on magazines, newspapers, road signs, public transport, business cards and in general any object, real or virtual, that can appear to a person in the real world.

Users who have smartphones with a camera and a suitable software for reading QR codes can scan, that is, acquire optically, the image of a QR code and receive the information encoded therein. This data connection to physical objects is commonly called "hardlink" or "real world hyperlink".

Document US-A-2011/283196 describes a web-based electronic RSVP service that allows the final user organizing an event to manage a list of guests for the event, to manage and organize the guests' RSVP replies, that is, whether or not they will be present at the event, to communicate with the guests before the event and communicate with the guests after the event. This RSVP service allows the guests to reply electronically to the RSVP requests by accessing a specific network address like a URL in a web browser. The service allows the guests to download and transmit information and other contents concerning the event, for example photos and videos, before, during or after the event. The service provides a personalization engine to allow the organizing final user to select a particular model of invitation card and to personalize it by adding personalization data such as photos, messages, colors. The service can be chosen by the organizing final user as part of a process for ordering invitations. In this case, guests can connect to the service using a web browser in order to send their replies. The replies and other data referring to the event can be accessible for the organizing final user and also for the guests. The service provides a webpage generation module to generate dynamically a series of RSVP webpages, defined as the RSVP website, in reply to the selection by the organizing final user of an RSVP option. The URL address connected to the RSVP website is generated dynamically and printed on the invitation cards sent to the guests and, in addition, can be transmitted directly by email to the guests. The URL address can be printed with alphanumerical characters on the back of the invitation card together with a QR code or other bar code format that can be scanned to connect to the RSVP website. Irrespective of how the guests connect to the RSVP website, that is, to the corresponding webpages, the guests themselves can access and modify various types of data of the event, for example information on the event, such as date, time and place, or can transmit photos and videos of the event, for example during or after the event, and send comments or other messages about the event. The organizing final user can also have the possibility of accessing data of the event and of modifying them. In particular, the organizing final user can select the RSVP service option and a URL is automatically generated for the RSVP website, or it is created manually by the organizing final user, for example by specifying a single URL that includes alphanumerical characters concerning the event. The invitation is displayed by the system for the organizing final user with the URL and/or QR code, with the possibility of modifying them or of removing the URL and/or the QR code. The guest can use the URL received or the QR code to connect to the RSVP website and give his/her reply. The users of the RSVP service can transmit photos, videos, comments and other data to the RSVP website before, during and after the event, transforming the RSVP website into a social network site for the specific event.

Consequently, limits and defects of this known RSVP service derive from a potential lack of confidentiality of the data and the possibility that they can be modified or integrated by guests with other information, text, messages, photos, videos, without any control by the organizing final user, in a most unwanted manner. In fact, one possible disadvantage of the RSVP service is that all the guests, and not only the organizing final user, can transmit informative content, text, messages, photos, videos or other multimedia contents to the RSVP website. Another disadvantage is the risk that identical URLs may be generated, and therefore the confidentiality of the data may be compromised if different users can access the same URL.

There is therefore a need to perfect a method and an apparatus to remotely display dynamic informative contents that can overcome at least one of the disadvantages of the state of the art.

One purpose of the present disclosure is to obtain a method and an apparatus to remotely display dynamic informative contents, in particular to present dynamic contents in reply to successive scannings of a QR code, which remains unchanged or static, and to cause said dynamic contents to be associated securely and univocally to a registered and authenticated user, that is, accredited to use at least the service of modifying contents.

Mobile computing devices, such as laptops, netbooks, tablets, smartphones and smart watches have, or are, becoming ubiquitous. Such devices have created a revolution in the way people communicate and exchange and use information. Establishing communication between such mobile computing devices is also becoming ubiquitous due to the very felt need of people to communicate by using such mobile computing devices. In particular, users desire to establish such communication, as seamlessly as possible, to and from each computing device so that they can be connected irrespective of how that connection is achieved.

Further aspects to be considered and related to the establishing communication issue is safety of the communication and privacy of the users.

Therefore, there is also a need to perfect a method and a system for initiating and establishing a communication between computing devices, in particular initiating and establishing an online exchange of messages in real time, i.e. instant messaging, with one or more simultaneous users of a computer network, e.g. a so-called chat, that can overcome at least one of the disadvantages of the state of the art.

The Applicant has devised, tested and embodied the present invention to obtain these and other purposes and advantages.

Unless otherwise defined, all the technical and scientific terms used here and hereafter have the same meaning as commonly understood by a person with ordinary experience in the field of the art to which the present invention belongs.

SUMMARY OF THE INVENTION

The present invention is set forth and characterized in the independent claims, while the dependent claims describe other features of the invention or variants to the main inventive idea.

Embodiments of the present disclosure relate to a method for establishing a communication between mobile computing devices. According to one embodiment, the method comprises:

providing a graphic code encoding a univocal Uniform Resource Identifier (URI) string;
capturing the graphic code by a first mobile computing device to activate said graphic code, wherein activation of the graphic code establishes that the resource over the network corresponding to said Uniform Resource Identifier (URI) string is available for instant messaging exchange communication between said first mobile computing device and another mobile computing device;
capturing the graphic code and decoding the string contained in said graphic code by a second mobile computing device;

wherein capturing the graphic code and decoding the string contained in said graphic code by the second mobile computing device triggers initiating and establishing an instant messaging exchange communication between the first mobile computing device and the second mobile computing device at the specific Uniform Resource Identifier (URI).

Data messages involved in the instant messaging exchange communication of the present disclosure can be text, enhanced text and/or ideograms (e.g. emoticons and/or emoji), and/or videos and/or pictures and/or audio data and/or documents or a combination thereof.

According to some embodiments, providing a graphic code encoding a univocal Uniform Resource Identifier (URI) string comprises:
defining a quantity n of a series of graphic codes to be generated;
generating x Uniform Resource Identifier (URI) strings, until x=n, wherein the generation of the Uniform Resource Identifier (URI) strings provides to generate a string with a length of m pseudo-random alphanumerical characters, with a cycle repeated m times, which calculates the remainder of the division between a random number and the length m of the string and uses it as an indicator to find the alphanumerical character;
verifying the univocity of each of the x Uniform Resource Identifier (URI) strings generated, by comparing them with Uniform Resource Identifier (URI) strings in a list of Uniform Resource Identifier (URI) strings;
generating n graphic codes, each encoding the x=n Uniform Resource Identifier (URI) strings generated and verified as univocal;
wherein, if a Uniform Resource Identifier (URI) string is univocal, it is stored in a database which comprises said list of Uniform Resource Identifier (URI) strings, a counter variable x is increased until x=n and the number at least of Uniform Resource Identifier (URI) strings corresponds to the value n of graphic codes of the series to be generated;
assigning a specific generated and univocal Uniform Resource Identifier (URI) string to a single specific accredited mobile computing device.

According to some embodiments, said instant messaging exchange communication is set as a private communication requiring a univocal security code for joining it.

According to some further embodiments, said method comprises generating at least one univocal security code for each graphic code, the univocal security code being required for the second mobile computing device, after capturing the graphic code and decoding the string contained in said graphic code, to join the instant messaging exchange communication with the first mobile communication device.

According to yet further embodiments, the Uniform Resource Identifier (URI) string is a URL address.

According to yet further embodiments, the Uniform Resource Identifier (URI) string is a URN string.

According to yet further embodiments, the graphic code is a QR-code.

According to yet further embodiments, the graphic code is portable.

According to yet further embodiments, the graphic code is physically provided on a substrate.

According to further embodiments, the graphic code is virtual.

According to still further embodiments, messages between mobile communication devices are routed via a messaging server.

According to further embodiments, messages between mobile communication devices routed via the messaging server are deleted from the messaging server.

According to further embodiments, the instant messaging exchange communication between mobile communication devices is encrypted.

According to further embodiments, the graphic code is configured to point to a dynamic content at said Uniform Resource Identifier (URI), the dynamic content including data messages.

According to further embodiments, the method further comprises establishing a real time voice and/or video communication over Internet Protocol (IP) networks between the first mobile computing device and the second mobile computing device.

Further embodiments relate to a method for establishing a communication between mobile computing devices. In one embodiment the method comprises:

providing a graphic code encoding a univocal Uniform Resource Identifier (URI) string, the graphic code being configured to establish that the resource over the network corresponding to said Uniform Resource Identifier (URI) string is available for instant messaging exchange communication between a first mobile computing device and another mobile computing device;

capturing the graphic code and decoding the string contained in said graphic code by a second mobile computing device; wherein capturing the graphic code and decoding the string contained in said graphic code by the second mobile computing device triggers initiating and establishing an instant messaging exchange communication between the first mobile computing device and the second mobile computing device at the specific Uniform Resource Identifier (URI).

Further embodiments relate to a system for establishing a communication between mobile computing devices. In one embodiment the system comprises:

one or more graphic code encoding a univocal Uniform Resource Identifier (URI) string; a first mobile computing device configured to capture the graphic code to activate said graphic code, wherein activation of the graphic code establishes that the resource over the network corresponding to said Uniform Resource Identifier (URI) string is available for instant messaging exchange communication between said first mobile computing device and another mobile computing device;

a second mobile computing device configured to capture the graphic code and decode the string contained in said graphic code;

a web/authentication server configured to manage initiating and establishing an instant messaging exchange communication between the first mobile computing device and the second mobile computing device at the specific Uniform Resource Identifier (URI) upon capturing the graphic code and decoding the string contained in said graphic code by the second mobile computing device;

a messaging server configured to at least route messages between the first mobile computing device and the second mobile computing device.

Further embodiments relate to a system for establishing a communication between mobile computing devices. In one embodiment the system comprises:

one or more graphic code encoding a univocal Uniform Resource Identifier (URI) string, the graphic code being configured to establish that the resource over the network corresponding to said Uniform Resource Identifier (URI) string is available for instant messaging exchange communication between a first mobile computing device and another mobile computing device;

a second mobile computing device configured to capture the graphic code and decode the string contained in said graphic code;

a web/authentication server configured to manage initiating and establishing an instant messaging exchange communication between the first mobile computing device and the second mobile computing device at the specific Uniform Resource Identifier (URI) upon capturing the graphic code and decoding the string contained in said graphic code by the second mobile computing device;

a messaging server configured to at least route messages between the first mobile computing device and the second mobile computing device.

According to further embodiments, the system is configured for establishing a real time voice and/or video communication over Internet Protocol (IP) networks between the first mobile computing device and the second mobile computing device.

Yet further embodiments relate to a non-transitory computer readable medium including at least computer program code for establishing a communication between mobile computing devices. In one embodiment, the computer readable medium comprises:

computer program code for providing a graphic code encoding a univocal Uniform Resource Identifier (URI) string;

computer program code for capturing the graphic code by a first mobile computing device to activate said graphic code, wherein activation of the graphic code establishes that the resource over the network corresponding to said Uniform Resource Identifier (URI) string is available for instant messaging exchange communication between said first mobile computing device and another mobile computing device;

computer program code for capturing the graphic code and decoding the string contained in said graphic code by a second mobile computing device;

computer program code for triggering initiating and establishing an instant messaging exchange communication between the first mobile computing device and the second mobile computing device at the specific Uniform Resource Identifier (URI) upon capturing the graphic code and decoding the string contained in said graphic code by the second mobile computing device.

According to further embodiments, the non-transitory computer readable comprises:

computer program code for managing initiating and establishing an instant messaging exchange communication between the first mobile computing device and the second mobile computing device at the specific Uniform Resource Identifier (URI) upon capturing the graphic code and decoding the string contained in said graphic code by the second mobile computing device;

computer program code for at least routing messages between the first mobile computing device and the second mobile computing device.

Yet further embodiments relate to a non-transitory computer readable medium including at least computer program code for establishing a communication between mobile computing devices. In one embodiment, the computer readable medium comprises:

computer program code for providing a graphic code encoding a univocal Uniform Resource Identifier (URI) string, the graphic code being configured to establish that the resource over the network corresponding to said Uniform Resource Identifier (URI) string is available for instant messaging exchange communication between a first mobile computing device and another mobile computing device;

computer program code for capturing the graphic code and decoding the string contained in said graphic code by a second mobile computing device;

computer program code for triggering initiating and establishing an instant messaging exchange communication between the first mobile computing device and the second mobile computing device at the specific Uniform Resource Identifier (URI) upon capturing the graphic code and decoding the string contained in said graphic code by the second mobile computing device.

According to further embodiments, the computer readable medium further comprises:

computer program code for managing initiating and establishing an instant messaging exchange communication between the first mobile computing device and the second mobile computing device at the specific Uniform Resource Identifier (URI) upon capturing the graphic code and decoding the string contained in said graphic code by the second mobile computing device;

computer program code for at least routing messages between the first mobile computing device and the second mobile computing device.

According to further embodiments, the computer readable medium further comprises:

computer program code for establishing a real time voice and/or video communication over Internet Protocol (IP) networks between the first mobile computing device and the second mobile computing device.

Further embodiments relate to a method for the remote display of dynamic informative contents by generating a QR code with a dynamic content, performed by an apparatus provided with a computer server system accessible from a communication network and in communication with a wireless communication network, such as a cell phone communication network. The computer server system can include an electronic memory to store a plurality of URI (Uniform Resource Identifier) strings (also referred to herein simply as URI or URIs) in a format readable by a computer. Embodiments of the method provide to generate at least one static QR code that encodes a URI string.

In possible implementations, the URI string can be a URL string (also referred to herein simply as URL) or a URN string (also referred to herein simply as URN).

For instance, the URI can be an URL and therefore, the method provides to generate at least one static QR code that encodes pointing information to the URL address on the Internet.

In other embodiments, the URI can be a URN.

It is provided that each URI is associated to one or more informative, text or multimedia contents, for example audio, photos, videos, which can be changed, modified, updated by a supplier of services or a system administrator who manages said computer server system or exclusively by a user who supplies said one or more informative contents.

In particular, embodiments described herein may relate to a method for the remote supply, display or presentation of dynamic informative contents by generating a QR code with a dynamic content, which provides:

to define a quantity n of a series of QR codes to be generated;

to generate x URI strings, until x=n;

to verify the univocity of each of the x URI strings generated, by comparing them with URI strings stored in a list of URI strings;

to generate n QR codes, each encoding the x=n URI strings generated and verified as univocal;

to assign a specific generated and univocal URI string to a single specific accredited user supplying one or more informative, text or multimedia contents;

to make available informative, text or multimedia contents, in a form that can be loaded and modified dynamically exclusively by the accredited user supplying said one or more informative contents or by the system administrator;

to configure the generated and assigned URI string in order to allow one or more receiving users to access or display the informative contents and the informative contents modified on each occasion exclusively by the supplier user or the system administrator;

to optically acquire the QR code and to decode the encoded URI string, by said one or more receiving users, directing them to the informative contents of the URI string assigned and accessing or displaying said informative contents and the dynamic informative contents, that is, those modified on each occasion exclusively by the supplier user or by the system administrator.

The present invention therefore has important advantages connected to a great confidentiality of the data and informative contents of the URI string assigned and to the fact that it is not provided that, apart from the supplier user or the system administrator, the data and informative contents of the specific URI string assigned are modified or integrated by the receiving users by other information, text, messages, photos, videos. In fact, in the present invention, only the supplier user or the system administrator can make available or modify the data and informative contents of the URI string assigned, whereas the receiving users can only access or display or in general receive and use said data and informative contents. Moreover, with the URI univocity control according to the present invention, identical URIs are not generated, avoiding any compromise of the confidentiality of the data.

In possible further embodiments, the dynamic contents related to the present disclosure can be messages or message data of an instant messaging exchange communication between mobile computing devices of a network or computer network. Messages and data messages can be text, enhanced text and/or ideograms (e.g. emoticons and/or emoji), and/or videos and/or pictures and/or audio data and/or documents or a combination thereof.

In possible further embodiments, the method comprises generating at least one univocal security code for each QR code that is presented to the receiving user unencrypted together with, or supplied separately from, the QR code and which is requested from the receiving user in order to access or display the informative contents of the URL address.

In possible further embodiments, the method comprises registration to a loading and dynamic modification service exclusively by the supplier user and authentication for access to the service by the registered supplier user, with the simultaneous univocal assignment of a URL address.

In possible further embodiments, the generation of the URL address provides to generate a string with a length of m pseudo-random alphanumerical characters, with a cycle repeated m times, which calculates the remainder of the division between a random number and the length m of the string and uses it as an indicator to find the alphanumerical character.

In possible further embodiments, the first character of the string is a function of the time when the string was created.

In possible further embodiments, if a URL address is univocal, it is stored in a database which comprises said list of URL addresses, a counter variable x is increased until x=n and the number at least of security URL addresses corresponds to the value n of QR codes of the series to be generated.

In possible further embodiments, the method comprises generating and store the QR code in a vectorial graphical format.

In possible further embodiments, the method provides that the decoded data of the QR codes correspond to the previously generated URL address and the data assigned unencrypted correspond to security codes generated.

In possible further embodiments, the method provides to dynamically modify the informative content associated to a specific URL address by a content management system (CMS) exclusively by a respective specific user supplying said informative content or a system administrator.

In possible further embodiments, combinable with all embodiments described herein, the method provides a general procedure of activating the QR code, registration and authentication wherein initially, by default, the previously generated QR code and the corresponding URL address and a possible security code are not associated to any user that, using an electronic device with a telecommunication capacity and Internet connection provided with software to read the QR code and a camera device for acquiring images, provides to scan the QR code and decode the URL address and carry out an addressing on a corresponding internet web browser and the computer server system, once it has received the addressing request to the URL address verifies, using the "matching" procedure, that the same URL address visited has effectively been generated and assigned by the computer server system and, if the QR code has already been assigned, the content of the associated URL address is displayed, while if the QR code has not yet been assigned, it is verified if the user is already registered and if affirmative it proceeds to the authentication thereof and the insertion of the possible security code, while if the user is not registered, it proceeds with the registration and insertion of the possible security code, after which the activation, registration and authentication procedure is terminated.

In possible further embodiments, combinable with all embodiments described herein, if the URL address exists in the database of the computer server system, a procedure is activated to univocally assign said URL address to a receiving user, which can provide that the possible security code associated to the QR code is inserted by the receiving user.

In possible further embodiments, combinable with all embodiments described herein, the method provides the assignment and reading of QR codes by receiving users, wherein an online system is prepared to decode the URL address contained in the scanned QR code, that the system verifies that the URL address contained in the scanned QR code effectively exists in the database and that, if the URL address does not exist, it provides to display an error screen, otherwise it provides to control the assignment of the ownership of the QR code to a receiving user, if the QR code has already been assigned to a receiving user, it provides to supply or display the content corresponding to the URL address contained in the QR code, otherwise the QR code is recognized as not assigned and consequently the registration is verified, with a consequent possible user registration step or, for a user already registered, the user authentication is carried out and the insertion of the possible corresponding security code by the receiving user, so as to proceed with the assignment of the ownership of the QR code to the user.

In possible further embodiments, the method provides to modify the contents associated to a URL address using a computer system to implement a content management system (CMS), accessible only through authentication to the computer server system, only by the supplier user or the system administrator and not by the users receiving the QR code, for the addition, modification or deletion of informative, text or multimedia contents, in the webpage corresponding to the URL address referred to by the decoding of the QR code.

In possible further embodiments, the modification permissions to edit the informative contents associated to a URL address encoded by a given QR code are exclusively assigned to the supplier user assignee of the QR code, or to the system administrator, to modify the content of the webpage associated to the URL address, while the user receiving the QR code cannot modify the informative contents of the webpage associated to said URL address.

In possible further embodiments, the informative contents which can be modified exclusively by the supplier user or the system administrator are of a text or multimedia nature, in particular providing one or more of the following operations:
i) addition/modification/deletion of text messages,
ii) addition/modification/deletion of images;
iii) addition/modification/deletion of videos;
iv) addition/modification/deletion of audios;
v) combination of the above i) to iv).

In possible further embodiments, the method provides to use a software filter, possibly with self-learning capacity, on the nature of the informative contents that can be associated to the webpage.

In possible further embodiments, the method provides to edit the contents by supplier users, wherein, after having scanned the QR code using a QR code reader or a camera device configured for capturing the QR code, the authentication of the user is requested which gives access to the supplier user to the Content Management System (CMS) through which to add, modify and eliminate informative contents, text, multimedia data, present at the URL address, encoded in the QR code.

In possible further embodiments, the method provides to edit the contents by editors or accredited service suppliers or system administrators, wherein a reserved area is prepared online with access regulated by reserved credentials, through which to carry out an authentication step and subsequently a modification and elimination step of the multimedia data present at the URL address contained in the QR code through the Content Management System (CMS).

In possible further embodiments, after having scanned the QR code using a QR code reader, it is provided to decode the URL address contained in the QR code and the multimedia content corresponding to the URL address referred to by the QR code scanned is restored in output.

In possible further embodiments, the method provides a reading and editing of contents of sensitive data by supplier users or accredited operators or system administrators, wherein an online system is prepared to decode the URL address contained in the QR code scanned by a QR code reader, it verifies that the URL address contained in the QR code reader scanned does effectively exist in the database and, if the URL address does not exist, it provides to display an error screen, while if the URL address contained in the QR code reader scanned really exists, once authentication has been carried out, it provides a verification if the user who accesses the service is also an operator enabled to edit the contents, wherein the user is standard, only the multimedia content of the URL address can be displayed, whereas if the user is an accredited operator or system administrator, as well as displaying it, they can also edit the contents thereof, using a Content Management System (CMS).

In possible further embodiments, the method comprises generating and assigning to a QR code a URL address on Internet, the informative content of which is dynamic and storable in a database, modifiable/editable as desired by said content management system (CMS) exclusively by users supplying said informative content or system administrators, and not by receiving users receiving the QR code and addresses of said informative content, said receiving users only being allowed to use the QR code and addresses of said informative content without being able to modify or integrate, said receiving user performing a passive role, except for reading the QR code and accessing the corresponding URL, in said remote supply, display and/or presentation of dynamic informative contents, said receiving user representing only an objective or target of the informative content, without being able to change or modify it.

Yet further embodiments relate to an apparatus for the remote supply, display or presentation of dynamic informative contents by generating a QR code with a dynamic content. In one embodiment, the apparatus comprises:

i) a computer server system configured:
to define a quantity n of a series of QR codes to be generated;
to generate x URL addresses on the Internet, until x=n;
to verify the univocity of each of the x URL addresses generated by comparing them with URL addresses stored in a list of URL addresses;
to generate n QR codes, each encoding the x=n URL addresses generated and verified as univocal;
to assign a specific generated and univocal URL address to a single and specific accredited supplier user of one or more informative, text or multimedia contents;
to make available said informative, text or multimedia contents, in a form that can be loaded and modified dynamically exclusively by the specific accredited supplier user or by one or more system administrators;
to configure the generated and assigned URL address in order to allow one or more receiving users to access or display the informative contents and the dynamic informative contents, that is, those modified on each occasion exclusively by the supplier user or by the system administrator;
ii) one or more portable electronic telecommunication devices configured to optically acquire the QR code and to decode the encoded URL address, by said one or more receiving users, directing the user to the informative contents of the assigned URL address made available by the computer server system and accessing or displaying said informative contents and the dynamic informative contents, that is, those modified on each occasion exclusively by the supplier user or by the system administrator;
iii) one or more user interfaces configured to access the computer server system and to load and modify dynamically said informative contents, exclusively by the supplier user or by the system administrator.

In further embodiments, a computer program is provided, able to be stored in a computer readable, which contains the instructions that, once executed by an apparatus, determine the execution of the method according to the embodiments described herein.

In further embodiments, an article or product, real or virtual, is provided, comprising a graphic code, such as for instance a QR code, generated using a method according to the embodiments described herein.

These and other aspects, features and advantages of the present disclosure will become better understood with reference to the following description, drawings and attached claims. The drawings, which are incorporated in and constitute a part of this specification, illustrate embodiments of the present subject matter, and together with the description, serve to explain the principles of the disclosure.

The various aspects and features described in the present disclosure can be applied individually, wherever possible. These individual aspects, for example the aspects and features described in the attached dependent claims, can be made subject of divisional applications.

It should be noted that any aspect or feature found already known during the patenting process is understood not be claimed and to be the subject of a disclaimer.

BRIEF DESCRIPTION OF THE DRAWINGS

These and other features of the present invention will become apparent from the following description of some embodiments, given as a non-restrictive example with reference to the attached drawings wherein.

To facilitate comprehension, the same reference numbers have been used, where possible, to identify identical common elements in the drawings. It is understood that elements and features of one embodiment can conveniently be incorporated into other embodiments without further clarifications.

DETAILED DESCRIPTION OF THE EMBODIMENTS

Figure 1:
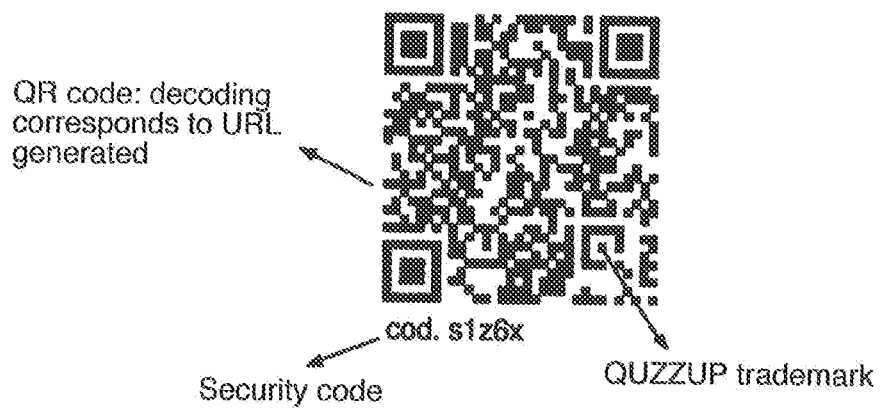
FIG. 1 is an example of a QR code obtainable with the method according to the present description.

Reference will now be made in detail to the various embodiments of the invention, one or more examples of which are illustrated in the figures. Within the following description of the drawings, the same reference numbers refer to the same components. Generally, only the differences with respect to individual embodiments are described. Each example is provided by way of explanation of the invention and is not meant as a limitation of the invention. For example, features illustrated or described as part of one embodiment can be used on or in conjunction with other embodiments to yield yet a further embodiment. It is intended that the present invention includes such modifications and variations.

Before describing these embodiments, it shall be also clarified that the present description is not limited in its application to details of the construction and disposition of the components as described in the following description using the attached drawings. The present description can provide other embodiments and can be obtained or executed in various other ways. It shall also be clarified that the phraseology and terminology used here is for the purposes of description only, and cannot be considered as limitative.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, representative illustrative methods and materials are now described.

As will be apparent to those of skill in the art upon reading this disclosure, each of the individual embodiments described and illustrated herein has discrete components and features which may be readily separated from or combined with the features of any of the other several embodiments without departing from the scope or spirit of the present invention. In addition, it will be readily apparent to one of ordinary skill in the art in light of the teachings herein that certain changes and modifications may be made thereto without departing from the spirit and scope of the appended claims. Any recited method can be carried out in the order of events recited or in any other order which is logically possible.

Embodiments described herein generally relate to communication between mobile computing devices of users of a computer network, using a graphic code or graphic identifier, e.g. a QR code, encoding a univocal Uniform Resource Identifier (URI) string.

As used herein, a Uniform Resource Identifier (URI) is a string of characters used to identify a resource. Such identification enables interaction with representations of the resource over a network, typically the World Wide Web, using specific protocols. Schemes specifying a concrete syntax and associated protocols define each URI. One form of URI can be a Uniform Resource Locator (URL), referred to as a web address. Another form can be a Uniform Resource Name (URN). For instance, but not in a limiting way, a URN can be typically used to complement URLs by providing a mechanism for the identification of resources in particular namespaces.

Various embodiments and possible applications according to the present disclosure will be described in greater detail below.

Method and Apparatus for the Remote Supply, Display and/or Presentation of Dynamic Informative Contents by Generating a QR Code with a Dynamic Content Some embodiments essentially provide to generate and assign to a QR code a URI string, the informative content of which is dynamic and storable in a database, hence modifiable/editable as desired by a content management system (CMS) exclusively by users supplying said informative content or system administrators, and not by users receiving the QR code and addresses of said informative content, which they can only use without being able to modify or integrate. In some embodiments, the receiving user, in particular, performs a passive role, except for reading the QR code and accessing the resource of the corresponding URI, in the remote supply, display and/or presentation of dynamic informative contents according to embodiments, since he/she represents only an objective or target of the informative content, without being able to change or modify it.

The application of embodiments described herein diffusely and on a wide scale will allow, for example, to eliminate paper backups with a consequent reduction of costs and with advantages of environmental sustainability, rapid access to bureaucratic or technical data normally accessible only by complex technical operations, thus avoiding the risk of losing information and archive materials. Furthermore, embodiments can be widely exploited in the field of entertainment to supply, display or present dynamic informative contents, text, photos, audio, videos or multimedia in general, associated for example to a determinate object, real or virtual, also including web contents, carrying a QR code generated according to the present invention.

Embodiments provide in particular to generate a URI string, for instance a URL address or a URN, and possibly one or more univocal security codes.

In some embodiments, in particular, it may be provided to generate at least one univocal security code for each QR code that is presented unencrypted to the receiving user together with, or supplied separately from, the QR code and which is requested from the receiving user in order to access or display the informative contents of the URI string.

Furthermore, the present embodiments may provide a control of the univocity of the URI string generated and generation of a QR code that encodes the URI string.

Furthermore, it may be provided to activate the QR code, to register the supplier user with the service and to authenticate access to the service by the registered supplier user.

Furthermore, it may be provided to manage the informative, text or multimedia contents, exclusively by the supplier user or the system administrator, by said content management system (CMS).

The present embodiments can be applied for example to the entertainment/amusements field, or information field or again for processing sensitive data, as will be described hereinafter by way of example.

In some embodiments a user supplying one or more informative, text or multimedia contents can register with a service for the remote supply, display or presentation of dynamic informative contents by generating a QR code with dynamic contents according to the present description. The method may provide to assign a specific URI string, generated and univocal, having encoded a respective QR code, to said user supplying one or more informative, text or multimedia contents, who is a single and specific supplier user for said URL address. The supplier user loads said one or more informative, text or multimedia contents so that they are accessible from the URI string. The supplier user supplies the QR code that encodes the URI string to a receiving user. The QR code can be stamped or printed on a real or virtual object, for example based on web content, which the supplier user provides to the receiving user. The receiving user reads the QR code and is then connected to the URI which is associated to said informative contents. For instance, in case that the URI string is a URL address, a web browser can connect the receiving user to the resource located at the URI. The receiving user can display, receive or use the informative contents but cannot change or integrate them.

Examples of Applications of Embodiments

Entertainment

Embodiments can be applied to personalize articles, products, objects, real or virtual, for example web content, provided with a QR code according to the present disclosure, which are used by a first user, or receiving user who temporarily or permanently possesses the article or product or object, real or virtual, and which can be personalized, updated, modified as desired, in their informative, text or multimedia contents, dynamically associated with the URI (e.g. URL address or URN) of the QR code, exclusively by a second user registered with and subscribing to the service, who temporarily or permanently provides the given article or product or object, real or virtual, to the first user, that is, modifiable exclusively by a supplier user or a system administrator. For example it may be provided to affix the QR code according to the present description, for example by printing or appliqué on articles of clothing or garments, such as sweaters, T-shirts, polo shirts, sweatshirts, shirts, trousers, skirts, clothing accessories such as bags, belts, shoes, hats, glasses, or furnishing elements or accessories, gift articles or stationery, toys, books and magazines, postcards, stamps or other, with the possibility of geo-referencing the QR code.

Sensitive Data

Embodiments can be used by affixing the QR code according to the present disclosure by printing or appliqué on documents, products or articles, for example relating to:
- the health field, for example providing a health card with a QR code the content of which can be updated or modified depending on the evolution of the user's clinical or health history;
- the tax field, providing for example a card, badge or sheet provided with a QR code the content of which can be updated or modified depending on the evolution of a user's tax history;
- the registry office, providing for example an identity card provided with a QR code with the user's data, such as personal data, tax data, driving license, archive of residences, court records;
- the insurance field, by interaction with automobile companies, insurance companies and proprietors of automobiles and motor vehicles, for example by affixing one or more QR codes according to embodiments on automobiles and motor vehicles, for example with the function of recording the insurance deadlines and the corresponding history, and also with the function of a "black box", to trace reliably all the events connected with the operating life of the means of transport (for example accidents, vehicle inspections, maintenance, tests, modifications);
- school, with the possibility of providing a QR code according to embodiments associated with each student on reports, university exam records, registration lists for exams;
- the field of documentation and archives, to access quickly and reliably contents that would otherwise be difficult to access, for example in the land register.

Information Field

Business and Advertising
- possibility of personalizing business cards with QR code according to embodiments, and thus be able to update data dynamically over time;
- possibility of using a QR code according to embodiments for advertising announcements, for example in the housing market, of updating or modifying the multimedia text of the announcement, but without needing to change the QR code itself;
- possibility of tracking and geo-localizing products by companies, with profiling of users and consumers;
- possibility that a QR code is generated not for a plurality of specific companies but for categories of companies, providing an identification code to distinguish, inside the same category, the same QR codes of the different companies. For example, it is possible to provide a single QR code for forwarding agents, another for retailers, etc., and associated univocal identification codes.

Field of Infrastructures and Public or Private Transport
- possibility of providing a QR code according to embodiments on tickets, receipts for public or private transport, by air, sea or land;
- possibility of providing tickets having a QR code according to embodiments for toll charges for access to transport routes;
- possibility of providing tickets having a QR code according to embodiments for charges for car park use;
- possibility of providing a QR code according to embodiments for road signs, with the possibility of supplying and updating service messages and public utility messages.

Field of Commerce
- field of maintenance of household appliances and domestic systems (water, light, gas), providing for example a ticket, card or badge provided with a QR code that carries the history of the maintenance, updatable or modifiable by the operator and displayable by the user;
- possibility of affixing the QR code according to embodiments on cards or tickets for accessing public premises, such as for example discos, bars, restaurants, cinemas, sports facilities;
- possibility of affixing the QR code according to embodiments on lottery tickets;
- possibility of affixing the QR code according to embodiments on paper advertising material distributed by hand, such as fliers, brochures or suchlike, and of updating the associated informative content, without needing to continuously print new versions thereof.

Field of Cultural Heritage
- possibility of affixing the QR code according to embodiments on tickets for entrance to museums, art exhibitions or sites of cultural interest;
- possibility of using the QR code according to embodiments permanently at museums, art exhibitions or sites of cultural interest, for the purposes of dissemination and information, updating the text or multimedia content thereof, depending on the aspect of cultural interest to be emphasized on each occasion, with the possibility of geo-referencing the QR code itself.

Tourism
- road signs for tourists provided with QR codes according to embodiments with information on the place visited;

possibility of associating one or more QR codes according to embodiments to reception structures, such as hotels, hostels, mountain refuges, restaurants or agritourisms, to supply and update information concerning them, with the possibility of geo-referencing the QR code itself.

With reference to FIGS. 2-8 we shall now describe possible embodiments of the present disclosure.
Generation of Series of Graphic Codes, e.g. or Codes, and Univocal Security Codes We shall now describe, in a non limiting manner, embodiments to generate for instance a URI which can be a URL address and the series of QR codes, or graphic codes in general, which can be used by system administrators, for example but not only for application in the field of entertainment/amusements or information, or again for processing sensitive data (see for example FIG. 2). By way of non-limiting example, the following description will be made with reference to a URL address, but it can be applied also in the case of a URN string as above defined.

Figure 2:
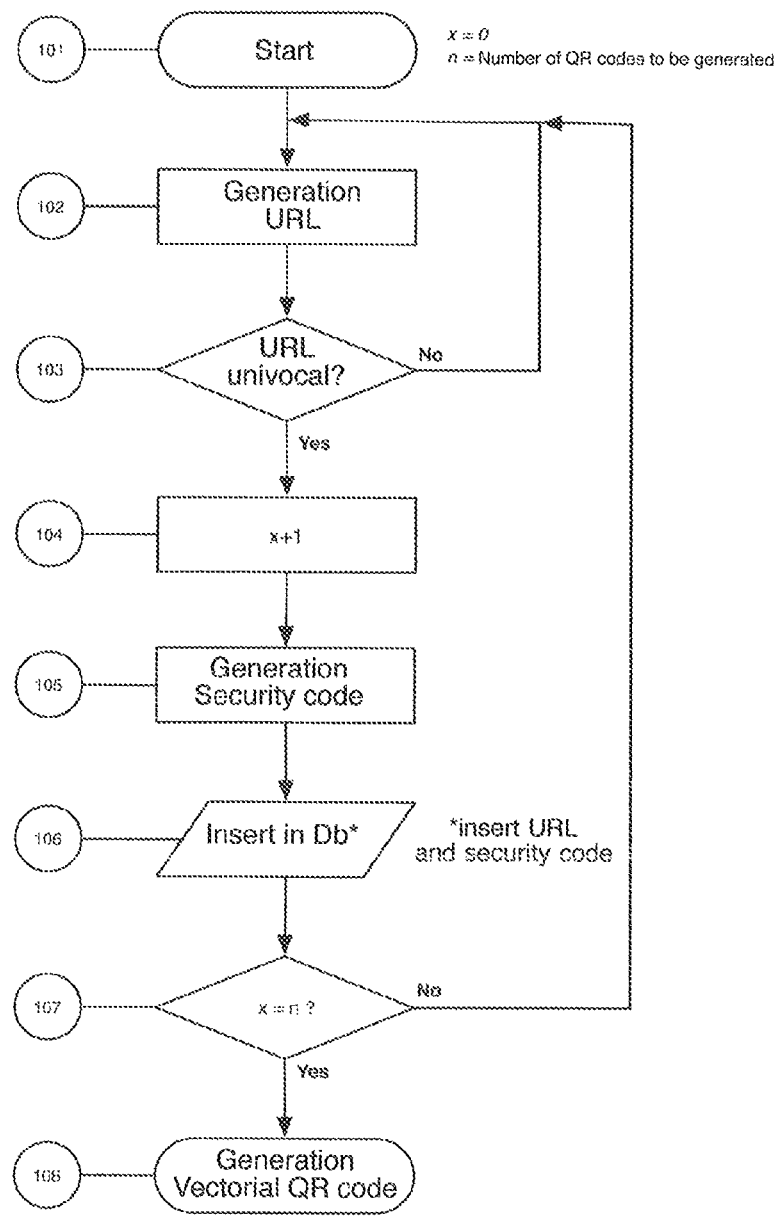
FIG. 2 is a block diagram of embodiments of part of the method according to the present description for generating series of QR codes by administrators.

An online computer system is prepared for generating series of graphic codes, e.g. QR codes, by administrator users who, for example by a graphical interface, can introduce the number "n" of QR codes to be generated (step 101 in FIG. 2).

The QR codes generated will be encoded with a URL address of the http://domain.ext/xyz type, where "domain" can be an Internet domain name registered, for example, by the system administrator, such as "tanmived" or "quzzup", "ext" is the extension of the domain, for example "it", "eu", "gov", "biz", "com", "org", and "xyz" is a string of m pseudorandom alphanumerical characters, for example 5<m<15, for example m=10, that can be generated by the following function (in which the variable length of the string is put for example equal to 10), wherein "m" is the value of the length of the string that is passed to the function (step 102 in FIG. 2):

```
function generatePassword($length=10) {
    $number = '1234567890';
    $letters = 'abcdefghijklmnopqrstuvwxyzABCDEFGHIJKLMNOPQRSTUVWXYZ';
    $code = '';
    $alt = time( ) % 2;
    for ($i = 0, $i < $length, $i++) {
        if ($alt == 1) {
            $code ,- $letters[(rand( ) % strlen($letters))];
            $alt = 0;
        } else {
            $code .= $number[(rand( ) % strlen($number))];
            $alt = 1;
        }
    }
    return $code;
}
```

For example, the code generated will begin with a letter or a number, depending on the time given by the time( ) native function. The values will be compiled with a cycle that will be repeated "m" times, where "m" is the value passed to the function corresponding to the length of the string to be generated. The cycle calculates the rest of the division between a random number and the length m of the string and uses it as an indicator to find the character. Once the cycle is finished, a string is therefore obtained which is as long as the value "m" passed to the function.

For each URL address generated, a control is made on its univociy in the system, essentially based on a string matching (step 103 in FIG. 2).

The following portion of code can control that the URL address generated is actually univocal.

```
$q="SELECT = FROM qrcode WHERE qrcode="",$temp."""; 
$r=mysql_query($q);
    if (mysql_num_rows($r)<1) (
    $q="INSERT INTO qrcode (qrcode, serie,codice_attivazione}
    VALUES ("".$temp."',
    ".$_GET['serie'].", "".$attivazione."')";
    mysql_query($q);
    )
```

If this condition occurs, the data is stored in the database, possibly together with the possible security code. The possible security code can be supplied to the receiving user, who will have to use it to access the URL address encoded by the QR code or the corresponding informative contents.

If the URL address generated is really univocal, the system will provide first of all to increase the variable x, or counter variable x, (step 104 in FIG. 2) and subsequently to generate a code, for example 5 pseudorandom alphanumerical characters, called security code (step 105 in FIG. 2). The URL address and the security code generated will then be registered in a database (step 106 in FIG. 2).

Through the same function as in step 102, or through another function, the other alphanumerical code may be generated, which can serve for example as a control at the moment of assignment to a user of the QR code in question.

In possible embodiments, at the end of each cycle the variable x will be compared with the variable n in such a manner as to verify that the number of pairs of URL/security code corresponds to the value of the variable n valued at the moment the series is created (step 107 in FIG. 2).

Once the cycle of generating the URL addresses and possible coupled security codes is terminated, the data can be passed to a function that will generate for each individual URL/security code a QR code in a vectorial graphical format (step 108 in FIG. 2).

In particular, after the data relating to the URL address and the possible security code has been inserted in a database, the image thereof is generated in vectorial format and saved in a directory on the file system of the computer server system.

For this purpose, a system is prepared for generating series of physical QR codes in vectorial graphical format.

The decoded data of the QR codes correspond to the URL address previously generated.

The data assigned unencrypted can correspond to the possible security codes generated.

The generation of the QR code and the file, for example in PDF format, for printing, is performed for example by two Open Source libraries both distributed by GNU LESSER GENERAL PUBLIC LICENSE.

The library that manages the generation of the image of the physical QR code—as shown for example in FIG. 1—can be for example the Open Source library PHP QR Code generator—Copyright © 2010 Dominik Dzienia, of which the following portion of code can be modified to generate a desired symbol or trademark, for example QUZZUP or TANMIVED.

```
'<g fill="#D90000">'."\n".
'<use x="310" y="310" xlink:href="#p" />'."\n".
'<use x="300" y="300" xlink:href="#p" />'."\n".
'<use x="280" y="300" xlink:href="#p" />'."\n".
'<use x="270" y="300" xlink:href="#p" />'."\n".
'<use x="260" y="300" xlink:href="#p" />'."\n".
'<use x="260" y="290" xlink:href="#p" />'."\n".
'<use x="260" y="280" xlink:href="#p" />'."\n".
'<use x="260" y="270" xlink:href="#p" />'."\n".
'<use x="260" y="260" xlink:href="#p" />'."\n".
'<use x="270" y="260" xlink:href="#p" />'."\n".
'<use x="280" y="260" xlink:href="#p" />'."\n".
'<use x="290" y="260" xlink:href="#p" />'."\n".
'<use x="300" y="260" xlink:href="#p" />'."\n".
'<use x="300" y="270" xlink:href="#p" />'."\n".
'<use x="300" y="280" xlink:href="#p" />'."\n".
'<use x="280" y="280" xlink:href="#p" />'."\n".
'</g>'."\n".
```

The library used to generate the corresponding PDF file can be for example TCPDF of Nicola Asuni—Tecnik.com.

As previously mentioned, the above described steps 102 to 108 can be used for generating univocal URI strings as well, according to the present disclosure.

Moreover, the above described steps 102 to 108 can be used for generating other graphic codes, or graphic identifier, than QR codes as well, according to the present disclosure.

Activation of the QR Code, Registration and Authentication

Figure 3:
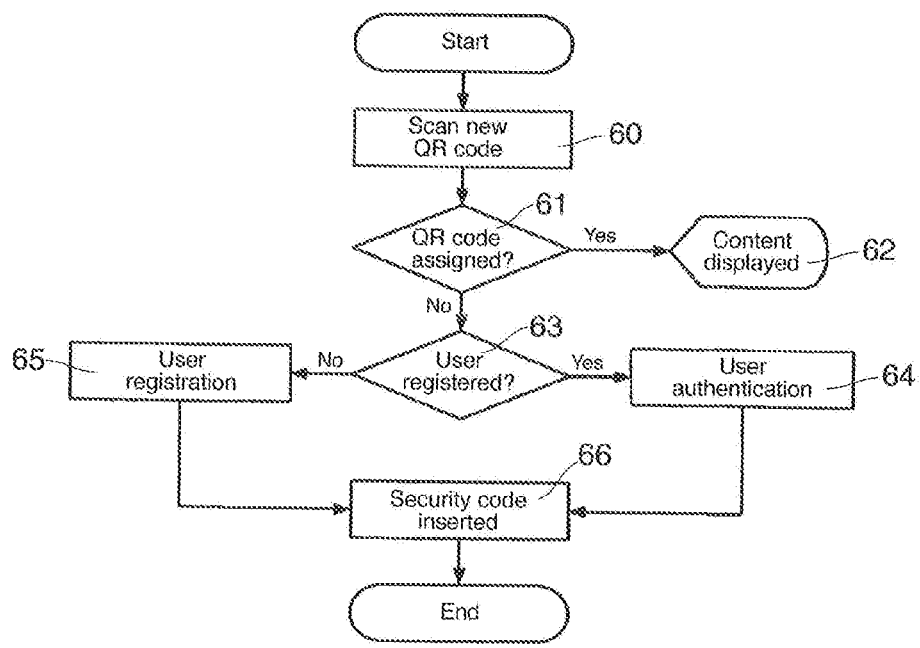
FIG. 3 is a block diagram of embodiments of part of the method according to the present description for acquiring and reading QR codes by users.

FIG. 3 is used to describe possible embodiments of a general procedure to activate, register and authenticate the QR code, usable according to the present description. According to the description, the QR code previously generated and the corresponding URI, for instance a URL address or a URN, and possible default security code are not associated to any user. By way of non-limiting example, the following description will be made with reference to a URL address, but it can be applied also in the case of a URN.

Using a smartphone for example, provided with a software for reading the QR code, or similar electronic device, for example mobile or portable, with telecommunication capacity and Internet connectivity, as well as acquisition and processing of images and QR code reading, it is possible to scan the QR code (step 60) and decode the URL address and perform addressing on the corresponding Internet browser. For example, other electronic devices usable can be a personal computer, remote terminals, tablets, phablets, notebooks, netbooks, ultrabooks or other. Once it has received the addressing request to the URL address, the computer server system verifies by a matching procedure that the same URL address visited has actually been generated and assigned by the computer server system as described by way of example above (step 61). If the QR code has already been assigned, the content of the associated URL address is displayed (step 62).

If the QR code has not yet been assigned, it is verified if the user is already registered (step 63) and if affirmative it proceeds to the authentication thereof (step 64) and the insertion of the possible security code (step 66). If the user is not registered, it proceeds with the registration (step 65) and subsequent step 66. After step 66, the activation, registration and authentication procedure is terminated.

If the URL address exists in the database of the computer server system, a procedure is activated to univocally assign said URL address to a user, which can provide for example to supply the possible security code associated to the QR code, for example inputting it in a data insertion mask, conditional to registration or authentication—if already registered—of the user to the website that supplies the service, for example domainname.ext.

Example of Assignment/Reading by Users

Figure 4:
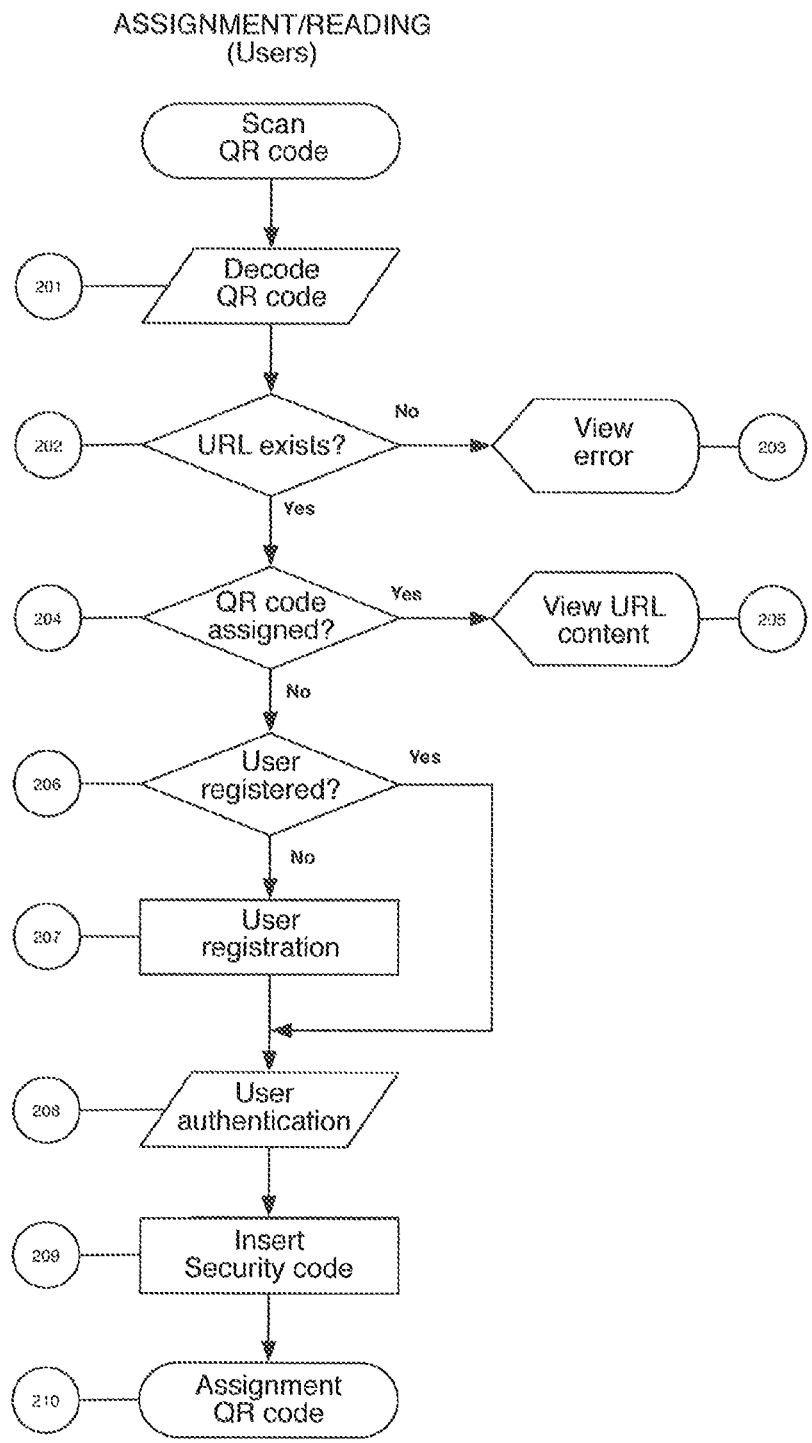
FIG. 4 is a block diagram of embodiments of a variant of a part of the method according to the present description for acquiring and reading QR codes by users, applied to entertainment.

We shall now describe embodiments, using FIG. 4, for the assignment and reading of QR codes by users, for example in the specific application to the field of entertainment. By way of non-limiting example, the following description will be made with reference to a URL address, but it can be applied also in the case of a URN.

An online system is prepared for decoding the URL address contained in the QR code scanned by any QR code reader (step 201).

The system will verify that the URL address contained in the QR code scanned actually exists in the database (step 202).

If the URL address does not exist, an error screen will be displayed (step 203), otherwise a control will be made on the assignment (step 204) of the ownership of the QR code to a receiving user. If the QR code has already been assigned to a receiving user, the multimedia content will be displayed corresponding to the URL address contained in the QR code (step 205), otherwise the QR code is recognized as not assigned and consequently the registration is verified (step 206), with a consequent possible user registration step (step 207) or, for a user already registered, the user authentication will be carried out (step 208) and the insertion of the corresponding security code (209) by the receiving user, so as to proceed with the assignment of the ownership of the QR code to the user (step 210).

Content Management System

A computer system is prepared to implement a content management system (CMS), which can be accessible only through authentication to the computer server system, only by the supplier user or the system administrator and not by the users receiving the QR code, for the addition, modification or deletion of informative, text or multimedia contents, in the webpage corresponding to the URL address referred to by the decoding of the QR code according to the present disclosure.

The modification or editing permissions to edit the informative contents associated to a URL address encoded by a given QR code are exclusively assigned to the supplier user assignee of the QR code in question, that is, to the supplier user, who in this way can modify the content of the webpage associated to the URL address at his discretion, for a finite or infinite number of times, while the user receiving the QR code cannot modify the informative contents of the webpage associated to this URL address.

The informative contents which can be modified exclusively by the supplier user or the system administrator, can be of a text or multimedia nature, in particular they can include for example:

i) addition/modification/deletion of text messages,
ii) addition/modification/deletion of images;
iii) addition/modification/deletion of videos;
iv) addition/modification/deletion of audios;
v) combination of the above i) to iv).

In possible embodiments, a software filter can be provided, possibly with self-learning capacity, on the nature of the informative contents that can be associated to the webpage, for example for the purposes of controlling privacy, to guarantee respect for morality or public order.

Example of Editing for Entertainment Use by Users

Figure 5:
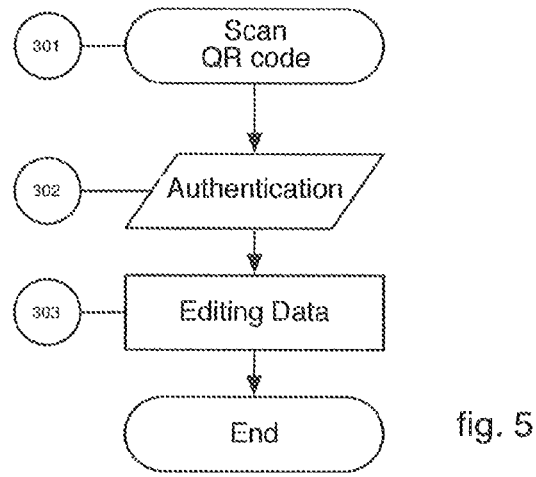
FIG. 5 is a block diagram of embodiments of a part of the method according to the present description for editing contents of QR codes by users, applied to entertainment.

We shall now describe some embodiments, using FIG. 5, for editing contents by users, in the specific application to the field of entertainment.

After having scanned the QR code using any QR code reader (step 301) the authentication of the user will be requested (step 302) which will give access to the supplier user to the Content Management System (CMS) through which it will be possible to add, modify and eliminate informative contents, text, multimedia data, present at the URI, (e.g. a URL address or URN), encoded in the QR code (step 303). For instance, this implementation can be used to initiate and establish a communication, such as a chat, between to mobile computing devices, such that for example two users can use the specific URI to exchange instant messages, which can be text messages, but also multimedia messages, such as audio, pictures, video, animations or documents or combination thereof as well.

Figure 6:
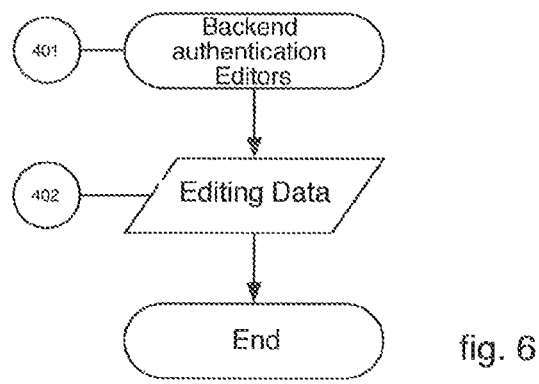
FIG. 6 is a block diagram of embodiments of a part of the method according to the present description for editing contents of QR codes by editors, applied to information use and processing of sensitive data.

Example of Editing for Information Use and Sensitive Data by Editors or Accredited Service Providers We shall now describe embodiments, using FIG. 6, for editing the contents by editors or accredited service suppliers, in the specific application for the information field or processing of sensitive data.

An online reserved area is prepared with access regulated by reserved credentials, such as log-in and password, through which to carry out an authentication step (step 401) and subsequently a modification and elimination step (step 402) of the multimedia data present at the URI (i.e. URL address or URN) contained in the QR code through the Content Management System (CMS).

Example of QR Code Reading for Information Use by Guests of the Service

Figure 7:
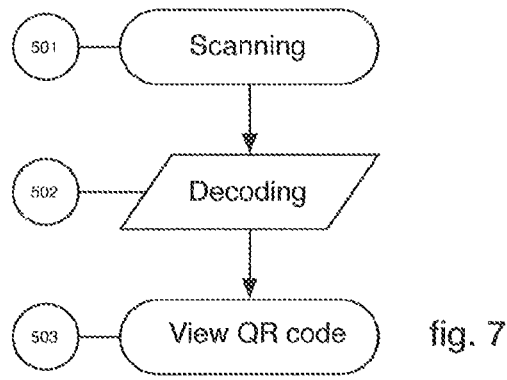
FIG. 7 is a block diagram of embodiments of a part of the method according to the present description for reading QR codes by a guest, applied to information use.

We shall now describe embodiments, using FIG. 7, for information use by guests of the service, for example in the case of services for tourism or commerce, or others described above by way of example. By way of non-limiting example, the following description will be made with reference to a URL address, but it can be applied also in the case of a URN.

After having scanned the QR code using any QR code reader (step 501), the system will decode the URL address contained in the QR code (step 502) and the multimedia content corresponding to the URL address referred to by the QR code scanned is restored in output (step 503).

Example of Reading/Editing for the Use of Sensitive Data by Users or Operators

Figure 8:
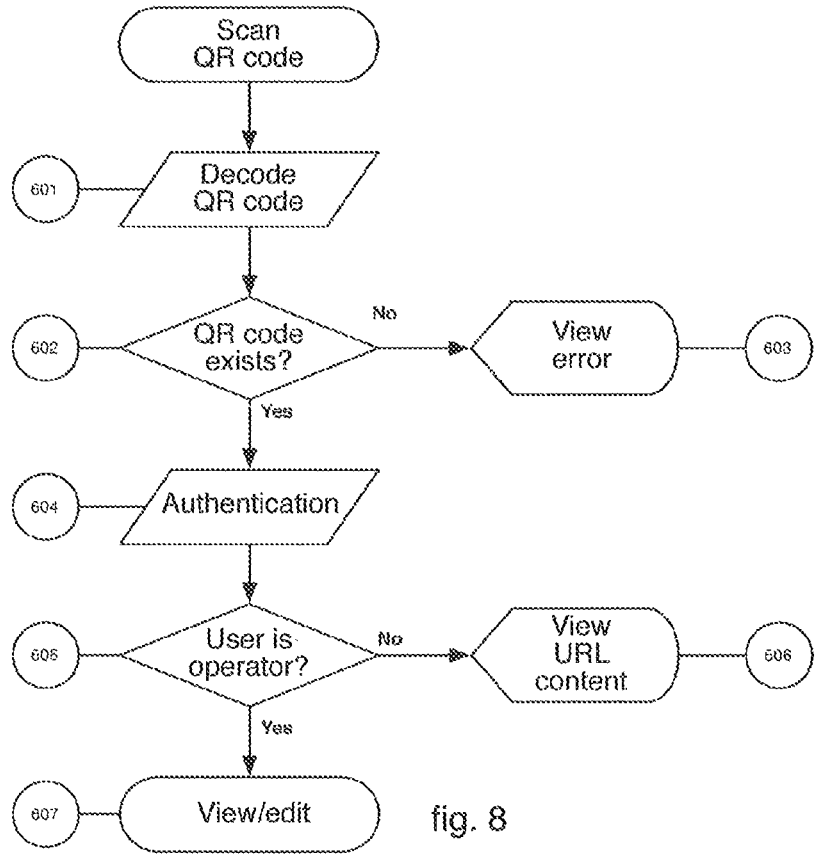
FIG. 8 is a block diagram of embodiments of a part of the method according to the present description for reading and/or editing contents of QR codes by users and operators, applied to the processing of sensitive data.

We shall now describe embodiments, using FIG. 8, for possible reading and editing contents of sensitive data by users or operators (for example in the health, tax or registry field or others described above by way of example). By way of non-limiting example, the following description will be made with reference to a URL address, but it can be applied also in the case of a URN.

An online system is prepared to decode the URL address contained in the QR code scanned by any QR code reader (step 601). The system verifies that the URL address contained in the QR code reader scanned does effectively exist in the database (step 602).

If the URL address does not exist, an error screen will be displayed (step 603). Instead, if the URL address contained in the QR code reader scanned really exists, once authentication has been carried out (step 604), verification is carried out to verify if the user who accesses the service is also an operator enabled to edit the contents (step 605). If the user is standard, only the multimedia content of the URL address can be displayed (step 606), whereas if the user is an operator, as well as displaying it, they can also edit the contents thereof (step 607), using a Content Management System (CMS).

Figure 9:
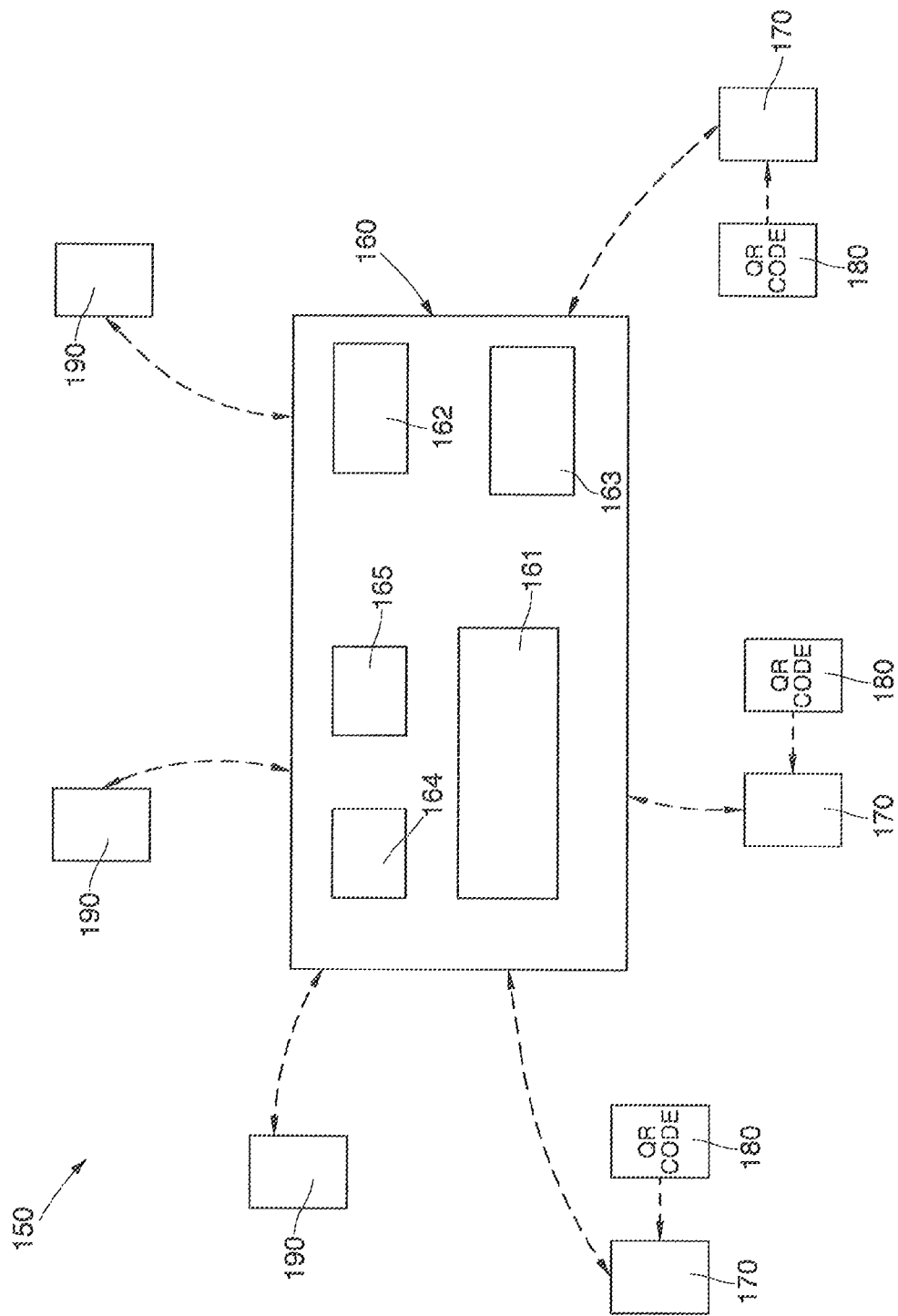
FIG. 9 is a block diagram of embodiments of an apparatus according to the present description.

Apparatus for the Remote Display of Dynamic Informative Contents by Generating a QR Code with Dynamic Content The method according to embodiments described herein can be executed using an apparatus, or electronic communication architecture 150 described for example with reference to FIG. 9, for the remote supply, display or presentation of dynamic informative contents by generating a QR code with a dynamic content. The following description can apply to a URI string that can be a URL address or a URN. The apparatus 150 comprises:

a computer server system 160 configured to:
    define a quantity n of a series of QR codes to be generated;
    generate x URI strings (for instance URL addresses on the Internet or URNs), until x=n;
    verify the univocity of each of the x URI strings generated by comparing them with URI strings stored in a list of URI strings;
    generate n QR codes, each encoding the x=n URI strings generated and verified as univocal;
    assign a specific generated and univocal URI string to a single and specific accredited supplier user of one or more informative, text or multimedia contents;
    make available said informative, text or multimedia contents, in a form that can be loaded and modified dynamically exclusively by the accredited user supplying said informative contents or by one or more system administrators;
    configure the generated and assigned URI string in order to allow one or more receiving users to access or display the informative contents and the dynamic informative contents, that is, those modified on each occasion exclusively by the supplier user or by the system administrator;
one or more portable electronic telecommunication devices 170 configured to optically acquire the QR code and to decode the encoded URI string, by said one or more receiving users, directing the user to the informative contents of the assigned URI string made available by the computer server system 160 and accessing or displaying said informative contents and the informative contents modified on each occasion exclusively by the supplier user or by the system administrator;
one or more user interfaces 190 configured to access the computer server system 160 and to load and modify dynamically said informative contents, exclusively by the supplier user or by the system administrator.

The list of URI strings can be stored and managed by a database. In some embodiments, the database can be implemented using MySQL. However, various different formats of databases can be used, for example Microsoft SQL, IBM SQL, etc.

In particular, the computer server system 160 can comprise a central processing unit 161 or CPU, an electronic memory 162, an electronic database 163 and auxiliary circuits (or I/O) (not shown).

For example, the CPU can be any form of processor for computers usable in the IT field for controlling computer security. The memory can be connected to the CPU and can be one or more of those available on the market, such as a random access memory (RAM), a read-only memory (ROM), floppy disc, hard disc, mass memory or any other form of digital archive, local or remote. The software instructions and the data can be encoded for example and stored in the memory to command the CPU. The auxiliary circuits can also be connected to the CPU to help the processor in a conventional manner. The auxiliary circuits can include for example at least one of: cache circuits, feed circuits, clock circuits, input/output circuits, subsystems and suchlike. A program (or computer instructions) readable by the computer server system 160 can determine which tasks are doable according to the method of the present description. In some embodiments the program is a software readable by the computer server system 160. The computer server system 160 includes a code to generate and store information and data introduced or generated in the course of the method according to the present description.

The computer server system 160 of the electronic communication architecture, or apparatus, 150 may provide a web server that can be an Apache web server on a Linux platform with PHP programmed software using a MySQL database. Additionally, the platform can exploit various techniques to establish communication with the clients and other services. For example, the electronic communication architecture 150 can expose an application programming interface (API) to allow communication with clients or other services. The API can be based on a Representational State Transfer (REST) architecture to distribute hypermedia systems.

The electronic communication architecture, or apparatus, 150 also comprises, as we said, one or more electronic portable telecommunication devices 170 associated with the various users and configured for telecommunication and data network connectivity, and also to acquire and encode the QR codes, such as typically a smartphone. Furthermore, the electronic communication architecture, or apparatus, 150 can provide one or more QR codes produced according to the present description and applied or printed on articles or objects 180 accessible for users.

The electronic communication architecture, or apparatus, 150 also comprises, as we said, one or more user interfaces 190 to access one's account on the computer server system 160 from remote, such as personal computers, remote terminals, smartphones, tablets, phablets, notebooks, netbooks, ultrabooks or other, by which a user can register and/or authenticate himself with the service at the computer server system 160 and access the service, loading, modifying, updating or eliminating the informative, text or multimedia contents associated with the URI string encoded in the QR code, or to several URI strings, associated to several QR codes that the user manages.

The central processing unit 161 can be configured and used to perform one or more steps of the method described herein.

The electronic memory 162 can be configured and used for example to store, temporarily or definitively, data useful for the execution of one or more steps of the method described herein, for example the informative contents loaded or modified on each occasion, and also the URI string generated.

The electronic database 163, which can be stored in the electronic memory 162 or can be stored on another memory support, can be configured and used to organize, manage and make available the data useful for executing one or more steps of the method described herein, for example to implement and organize the Content Management System (CMS), and also for allocating the URI strings generated, managing the policies for controlling the univocity of the URI strings generated, the univocal association thereof to QR codes and the univocal association of the QR codes to the users accredited with the service.

The computer server system 160 can also provide an input interface 164, or in any case an input device, for example connected in a network with other computers, or a telecommunication network. The input interface 164 can be configured and used to execute the insertion step 100.

The computer server system 160 can also provide one or more network connection devices 165, such as boards, modules or gates for network communication, wireless or cabled, with a network of other computers or a telecommunication network. These one or more network connection devices 165 can be used to access the computer server system 160 to execute from remote the method according to the present description.

Figure 10:
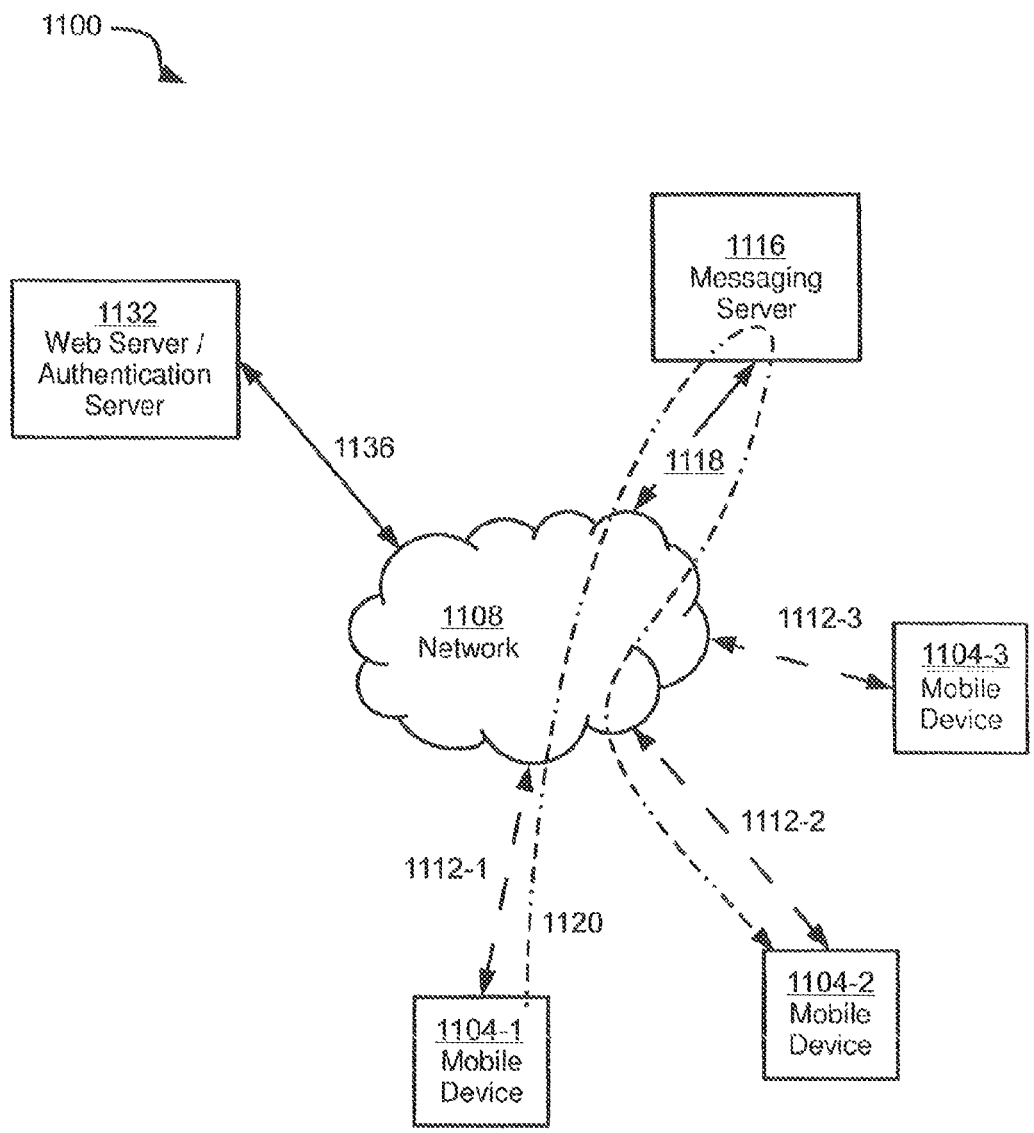
FIG. 10 shows a communication system according to embodiments of the present disclosure.

System and Method for Establishing a Communication Between Mobile Computing Devices FIG. 10 is used to describe embodiments of a communications system 1100 that can be used in combination with all the other embodiments described herein, for establishing an instant messaging exchange communication between mobile computing devices by capturing a graphic code, such as for instance a QR code, encoding a univocal URI string obtained as described above, for instance in above paragraph GENERATION OF SERIES OF GRAPHIC CODES, e.g. QR CODES, AND UNIVOCAL SECURITY CODES.

Advantageously, the graphic code is configured to point to a dynamic content at said Uniform Resource Identifier (URI), the dynamic content including data messages.

According to further embodiments, System 1100 can include a plurality of mobile computing devices 1104-1, 1104-2 and 1104-3, referred to generically as a mobile computing device 1104, and collectively as mobile computing devices 1104. Additional mobile computing devices (not shown) can be included in system 1100. Each mobile computing device 1104 can be any of a cellular phone, a smartphone, a tablet computer, a phablet computer and the like.

Data messages of the instant messaging exchange communication between mobile computing devices can be text, enhanced text and/or ideograms (e.g. emoticons and/or emoji), and/or videos and/or pictures and/or audio data and/or documents or a combination thereof.

System 1100 includes a network 1108. Mobile computing devices 1104-1, 1104-2 and 1104-3 are connected to the network 1108 via respective links 1112-1, 1112-2 and 1112-3, which can be wireless links but can also be wired links, or any suitable combination of wired and wireless links. Network 1108 can include any suitable combination of wired and wireless networks, including but not limited to a Wide Area Network (WAN) such as the Internet, a Local Area Network (LAN) such as a corporate data network, cell phone networks, WiFi networks, WiMax networks and the like.

System 1100 further includes a messaging server 1116. Via network 1108, mobile computing devices 1104 can communicate with the messaging server 1116 connected to network 1108 via a link 1118. Messaging server 1116 executes a service or application that is of interest to the users of mobile computing devices 1104. For example, mobile computing device 1104-1 can execute a messaging application for sending and receiving messages to and from other mobile computing devices 1104 executing the same messaging application. Such messages can include instant messages (e.g. Internet Protocol-based messages), Short Message Service (SMS) messages, Multimedia Messaging Service (MMS) messages and the like. In this example, mobile computing device 1104-1 can be configured to transmit a message addressed to an account associated with mobile computing device 1104-2 to messaging server 1116. Messaging server 1116 stores associations between account names and unique identifiers of mobile computing devices 1104 such as IP addresses, MAC addresses and the like. Messaging server 1116 thus receives the message, looks up the unique identifier of the addressee (the addressee being the account associated with mobile computing device 1104-2), and routes the message via network 1108 to mobile computing device 1104-2, as shown for instance by message path 1120.

According to embodiments, the messaging functionality described above can be accessed on the above mobile computing devices 1104.

To enable communication between mobile computing devices 1104-1, 1104-2, 1104-3, an association between the mobile computing devices 1104-1, 1104-2, 1104-3 may be required, Messaging server 1116 establishes connection between associated mobile computing devices 1104-1, 1104-2, 1104-3.

To assist in providing the association between the mobile computing devices 1104-1, 1104-2, 1104-3 mentioned above, system 1100 may also include a web server and authentication server 1132, also referred to herein as server 1132 connected to network 1108 via a link 1136, which is illustrated as a wired link, but could also be a wireless link or a combination or wired and wireless links. Web/authentication server 1132 establishes an association between mobile computing devices mobile computing devices 1104-1, 1104-2, 1104-3.

Once that association is established, messaging server 1116 is configured to route certain communications between mobile computing devices 1104-1, 1104-2, 1104-3 in order to provide the functionality of the messaging application between the mobile computing devices 1104-1, 1104-2, 1104-3.

Figure 11:
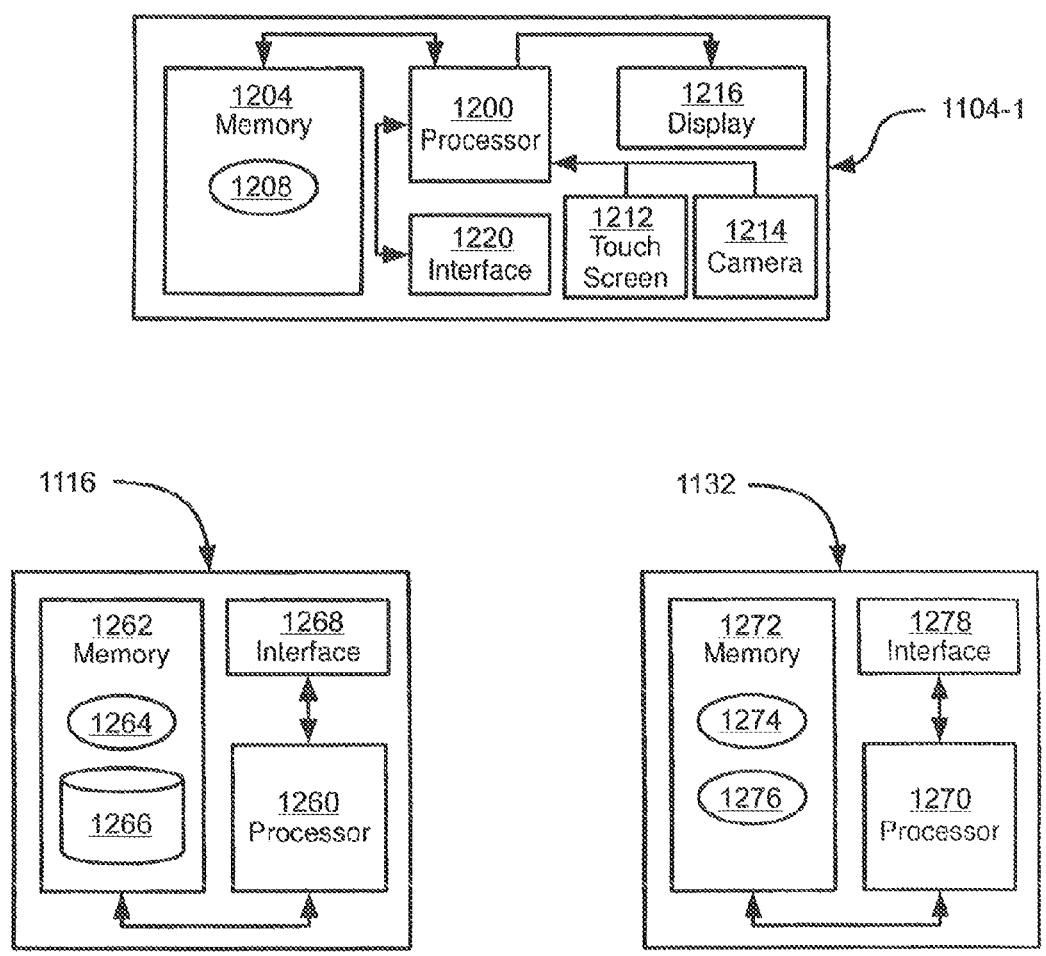
FIG. 11 shows certain internal components of the devices of FIG. 10, according to embodiments of the present disclosure.

Before a detailed discussion of the operation of system 1100 is provided, certain components of mobile computing device 1104-1 (applying to all the other mobile computing devices 1104-2, 1104-3 as well and in general 1104), messaging server 1116 and server 1132 will be described with reference to FIG. 11.

Mobile computing device 1104-1 includes a processor 1200 interconnected with a memory 1204. Memory 1204 stores computer readable instructions executable by processor 1200, including a messaging application 1208 as discussed earlier.

When processor 1200 executes the instructions of messaging application 1208, mobile computing device 1104-1 is configured to perform various functions related to exchanging messages with other mobile computing devices 1104. Mobile computing device 1104-1 can also include input devices interconnected with processor 1200, for example in the form of a touch screen 1212 and a camera 1214, albeit a keyboard, physical or virtual, can also be contemplated. Mobile computing device 1104-1 can also include other input devices, such as any suitable combination of a keypad, a microphone, a GPS receiver, and the like (not shown).

Mobile computing device 1104-1 can also include output devices interconnected with processor 1200, including a display 1216 integrated with touch screen 1212. Other output devices can also be provided, such as a speaker (not shown). Mobile computing device 1104-1 can also include a network interface 1220 interconnected with processor 1200, which allows mobile computing device 1104-1 to connect to network 1108 via link 1112-1.

Network interface 1220 thus includes the necessary hardware, such as radio transmitter/receiver units, network interface controllers and the like, to communicate over link 1112-1.

Messaging server 1116 includes a processor 1260 interconnected with a memory 1262. Memory 1262 stores computer readable instructions executable by processor 1260, including a routing application 1264. When processor 1260 executes the instructions of routing application 1264, messaging server 1116 is configured to perform various functions related to routing messages between mobile computing devices 1104.

Messaging server 1116 stores a routing database 1266 containing associations between addressee identifiers and unique identifiers of destinations. Messaging server 1116 also includes a network interface 1268 interconnected with processor 1260, which allows messaging server 1116 to connect to network 1108 via link 1118. Network interface 1268 thus includes the necessary hardware, such as network interface controllers and the like, to communicate over link 1118 (see e.g. FIG. 10).

Web/authentication server 1132 includes a processor 1270 interconnected with a memory 1272. Memory 1272 stores computer readable instructions executable by processor 1270, including a web server application 1274 and an authentication application 1276. When processor 1270 executes the instructions of web server application 1274 and authentication application 1276, server 1132 is configured to perform various functions related to responding to web session requests and creating an association between mobile computing devices 1104-1, 1104-2, 1104-3. Server 1132 also includes a network interface 1278 interconnected with processor 1270, which allows server 1132 to connect to network 1108 via link 1136. Network interface 1278 thus includes the necessary hardware, such as network interface controllers and the like, to communicate over link 1136 (see e.g. FIG. 10).

According to embodiments, using the messaging application 1208 installed in the mobile computing device 1104 may include the messaging application 1208 requiring the user, e.g. the owner or the specific user of the mobile computing device 1104, to first create an account and register as a user of the messaging service provided by system 1100 and possibly to create a user profile and then to log in into the service by using login credentials. Creating the account may therefore include defining identity data, such as login credentials, optionally, but not mandatorily, personal information and/or legal information. Login credentials may be used by the user to access functionalities of the messaging application 1208. Creating the account and the user profile may for example include defining login credentials by selecting an appropriate user ID or username and password. Optionally, but not mandatorily, personal information may include information related to the user, such as a nickname, the real name, contact information (e.g. cellular phone number, personal e-mail address etc. . . . ), gender, date of birth or other demographic data and/or a picture related to the user. Such personal data are, however, not mandatory, therefore users of the system and method according to the present disclosure can be anonymous. This aspect can improve safety and privacy.

Figure 13:
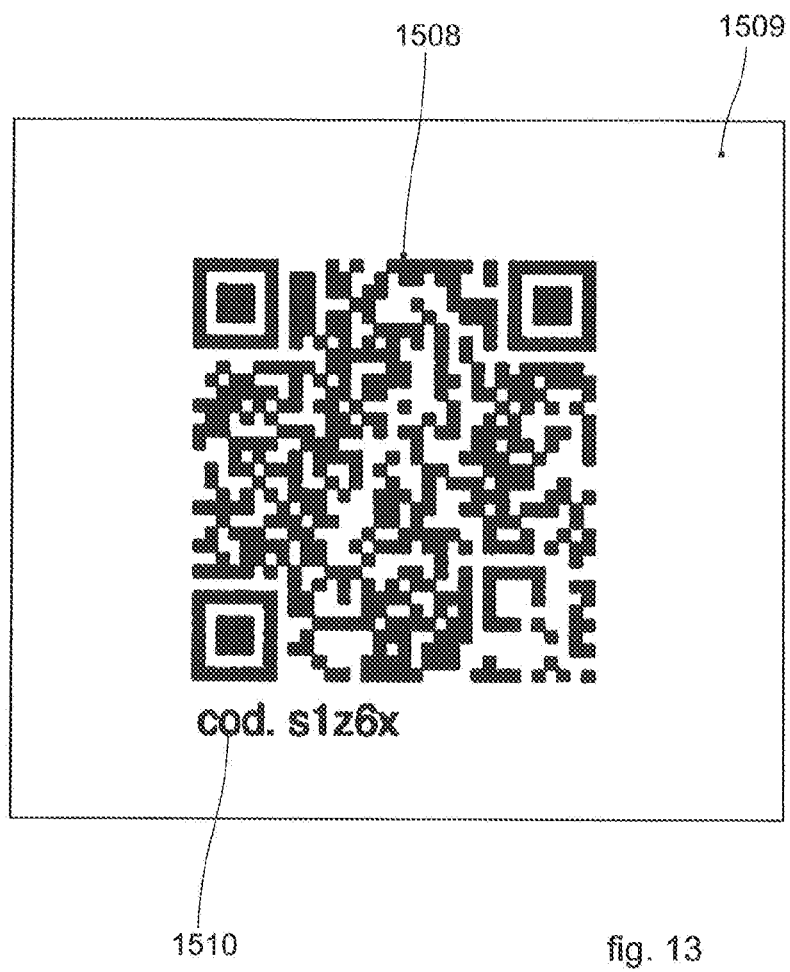
FIG. 13 shows a graphic code which can be used in a method and system for initiating and establishing a communication between mobile computing devices according to embodiments of the present disclosure.

According to embodiments, a registered user is granted one or more graphic codes, e.g. QR codes, encoding a univocal URI string, such as a URL address or a URN, obtained according to the present disclosure (see e.g. code of FIG. 1 and code 1508 of FIG. 13).

Advantageously, the graphic code 1508 can be portable, meaning that a user wishing to offer access to a chat to another user can easily carry or move the graphic code 1508 everywhere he/she goes, i.e. the graphic code 1508 can always be together with, or follow, the user. As described above, such graphic codes, e.g. QR codes, or codes 1508, can be physically provided on a physical substrate, for instance printed or applied on an item or product, or can be virtual, provided virtually on a substrate, e.g. via electronic rendering on a display or screen of TV-set, a computing device, such as a mobile computing device, or a laptop, a desktop computer and the like. FIG. 13 shows a code 1508 applied on an item 1509. Graphic codes, e.g. QR codes, or codes 1508 can also be worn or borne by a user whishing to make available the possibility for other user(s) to start an instant messaging exchange communication with him/her. Such codes can be directly worn or borne by the user or applied to items, clothes, garments or accessories worn or borne by the user.

Code 1508 can be provided together with a univocal security code 1510 as well (see FIGS. 13 and 14), as described for instance with reference to FIGS. 2 and 3. Univocal security code 1510 can be generated by server 1132 and provided in association or connection with code 1508. The univocal security code 1510 can be presented unencrypted to the receiving user together with, or supplied separately from, the code 1508 and it can requested to access the URI string. For instance the univocal security code 1510 can be a pseudorandom alphanumerical characters as above described which can be generated for instance as described in above paragraph GENERATION OF SERIES OF GRAPHIC CODES, e.g. QR CODES, AND UNIVOCAL SECURITY CODES. Code 1510 can be, for instance, provided together with code 1508 as it is clear for instance from FIG. 13. For example, user, in order to capture code 1508 shall be in proximity with code 1508 and thus he/she can see code 1510 provided together with code 1508 as well. User capturing the code 1508 can therefore have knowledge also of the univocal security code 1510 and then he/she will be required, after capturing code 1508, to enter code 1510 into his/her mobile computing device 1404, in order to grant access to the URI string and thus to the instant messaging exchange communication.

In one possible implementation, by first receiving a graphic code, e.g. QR code, as above described, a user can then be prompted to download and install the messaging application 1208 on the mobile computing device 1104 and then to register by creating an account and logging in for using the messaging application 1208.

In one other possible implementation, a user can first be prompted to download and install the messaging application 1208 on the mobile computing device 1104 and then to register by creating an account and then logging in. Afterwards, the user can receive or acquire a graphic code, e.g. QR code, as above described.

In both implementations, messaging application 1208 of the mobile computing device 1104 can be used to activate a graphic code provided to, or owned by, the user. Activation can be made for instance by capturing the graphic code with the camera 1214 and then decoding the graphic code to access the URI contained therein (see e.g. FIG. 14). Activating a graphic code thus implies that the URI encoded in the graphic code is assigned to the specific user and therefore the resource located at the URI can be used for instant messaging exchange between the specific user and another user in turn receiving the activated the graphic code by the specific user owning the graphic code.

According to embodiments, a graphic code can be stored in memory 1272 in connection with an identifier of a specific mobile computing device 1104 (such as an IP address).

Figure 16:
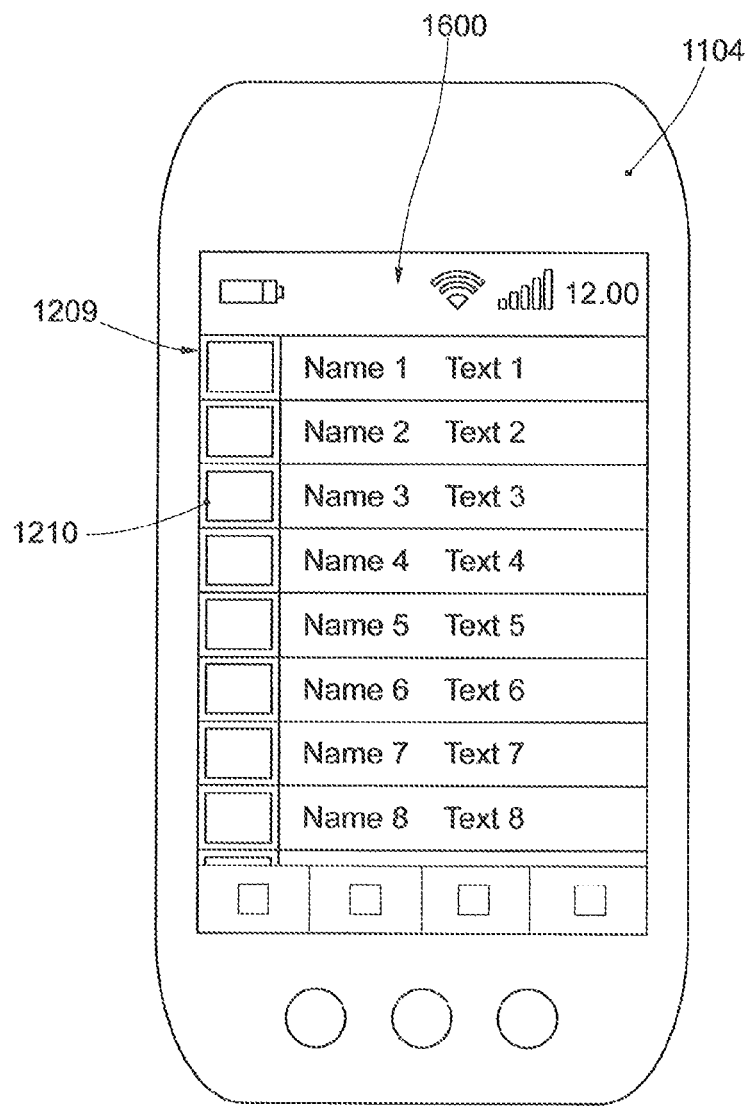
FIG. 16 shows a further interface generated by a mobile computing device of FIG. 10 during the performance of the method of FIG. 12 according to embodiments of the present disclosure.

Once a graphic code is activated by the specific user owning the graphic code, an entry related to the URI encoded therein can be displayed by the messaging application 1208 in the mobile computing device 1104, thus populating a list of possible resources available for the specific user (see e.g. FIG. 16). In this way, for instance, the messaging application 1208 can display a populated list of possible different chats of the specific user with other user(s).

According to a method 1300 of establishing a communication between mobile computing devices, a registered user owning a graphic code as described above can thus initiate and establish a communication between his/her own mobile computing device 1104 and the mobile computing device 1104 of another user firstly by, physically or virtually, providing the other user with the graphic code.

Figure 12:
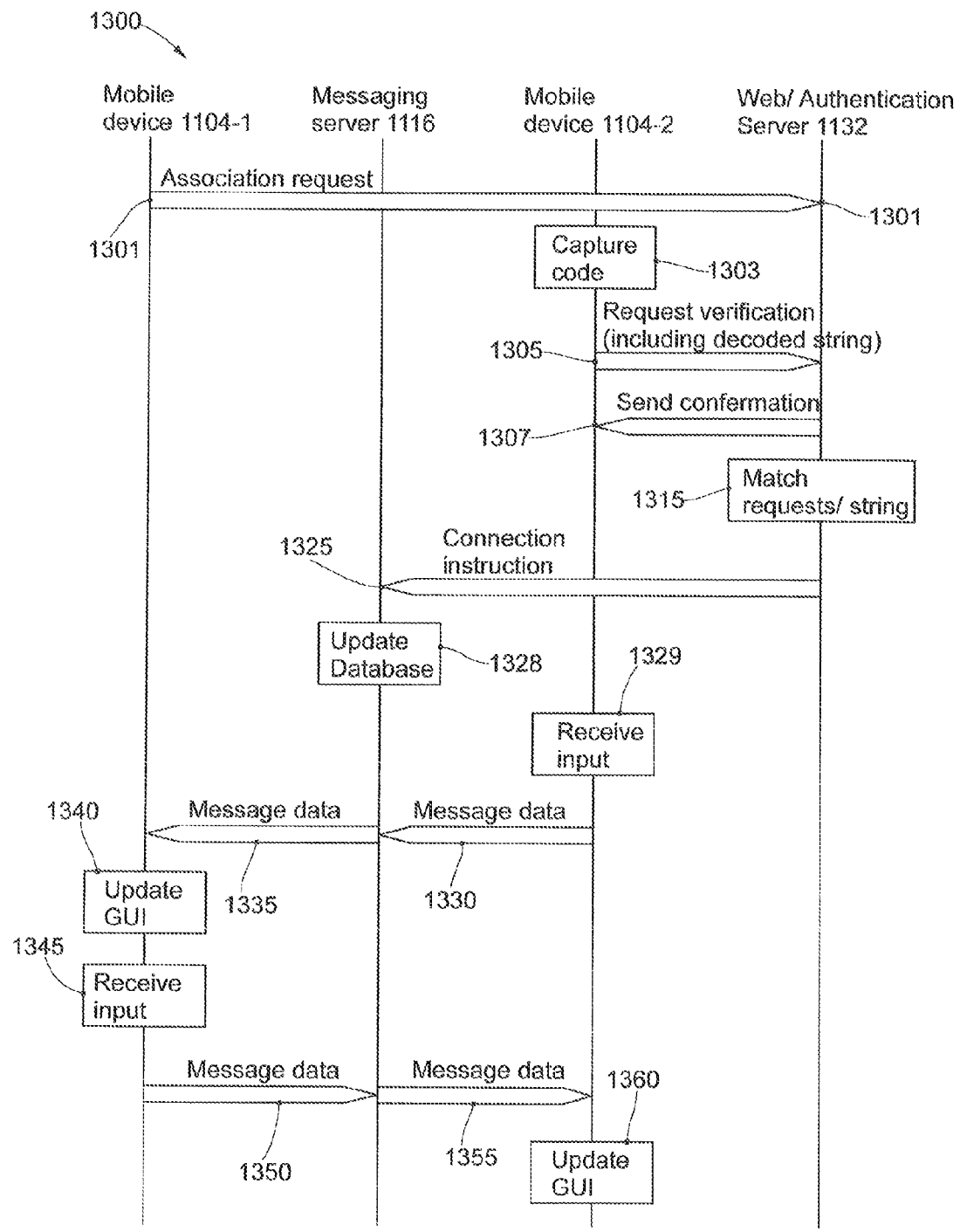
FIG. 12 shows a method for initiating and establishing a communication between mobile computing devices according to embodiments of the present disclosure.

Embodiments of a method 1300 of establishing a communication between mobile computing devices are described using FIG. 12. Method 1300 will be described in connection with its performance on system 1100, to establish communication between mobile computing devices 1104-1 (or first mobile computing device), 1104-2 (or second mobile computing device), 1104-3 (or third mobile computing device), wherein mobile computing device 1104-1 is owned or used by user 1, 1104-2 is owned or used by user 2, 1104-3 is owned or used by user 3.

Preliminarily, at step 1301, mobile computing device 1104-1 is configured to activate a graphic code. Activation of the graphic code establishes that the resource over the network corresponding to said Uniform Resource Identifier (URI) string is available for instant messaging exchange communication between first mobile computing device and another mobile computing device. Mobile computing device 1104-1, executing messaging application 1208, is configured to transmit an association request to server 1132, which receives the association request and stores the association request in memory 1272. The association request may include an identifier, such as an account name, IP address or the like, of mobile computing device 1104-1. The association request may also include the code 1508 or a string encoded from code 1508. In practice, association request of step 1301 can be used by mobile computing device 1104-1 to activate code 1508 such that code 1508 can be used to initiate and establish an instant messaging exchange communication with mobile computing device 1104-2. According to the present disclosure, initiating and establishing the instant messaging exchange communication can then be triggered by the mobile computing device 1104-2 capturing code 1508 (see e.g. FIG. 14) and decoding the univocal URI string contained therein, as explained below in greater detail. Therefore, in order to make available a code 1508 which, upon capturing and decoding the string contained therein, grants a user (such as user 2) the possibility of communicating by instant messaging exchange, user 1 will firstly activate the code 1508 according to step 1301 and then, code 1508 thus activated, may be provided or made available by any means by user 1 to another user, such as user 2. Providing code 1508 from user 1 to another user can be user specific, i.e. user 1 can specifically select the user 2 receiving code 1508, or can be user non-specific, i.e. user 1 can make available code 1508 to any user and the first user that captures it, is then the user that can have access to the specific instant messaging exchange communication assigned to the captured 1508.

Figure 14:
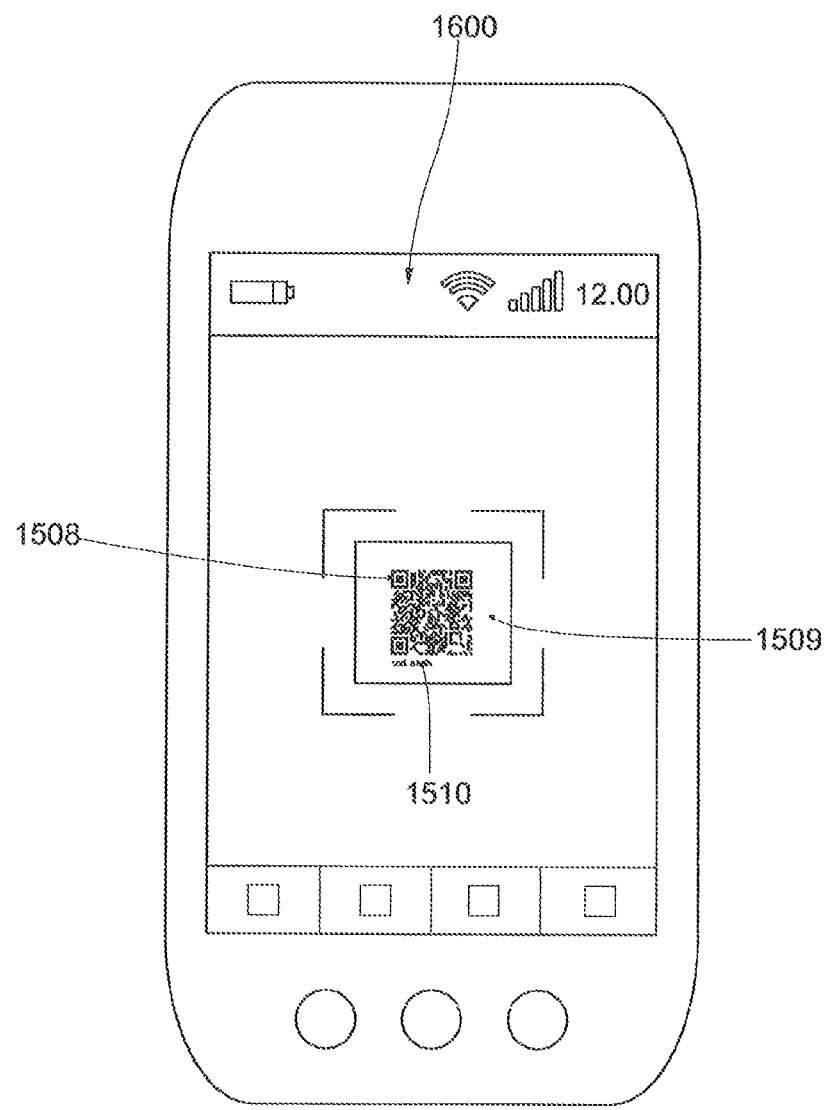
FIG. 14 shows an interface generated by a mobile computing device of FIG. 10 during the performance of the method of FIG. 12 according to embodiments of the present disclosure.

Continuing with describing method 1300, at step 1303, mobile computing device 1104-2 of user 2 is configured to capture an image including graphic code 1508 (e.g. a QR code, see FIG. 13). In particular, processor 1200 of mobile device 1104-2 is configured to receive input from touch screen 1212 instructing processor 1200 to control camera 1214 to capture an image. FIG. 14 shows an example of an interface presented on display 1216 after receipt of the input activating camera 1214, and before the actual capture of an image.

As seen in FIG. 14, mobile computing device 1104-2 can present a window 1600 including the field of view of camera 1214 (in which code 1508 is visible). The same description may apply to mobile computing device 1104-1, for instance when activating the code 1508 as above described.

Having presented window 1600, mobile computing device 1104-2 is configured to receive an input (for example, from touch screen 1212) activating the shutter of camera 1214. Mobile computing device 1104-2 thus captures an image using camera 1214 and stores the image in memory 1204. Mobile computing device 1104-2 is also configured to decode the URI string contained within code 1508.

Therefore, in step 1303 the mobile computing device 1104-2 can capture and decode the graphic code encoding the string containing the specific URI already assigned to specific user 1 using mobile computing device 1104-1 according to step 1301.

Then, at step 1305 mobile computing device 1104-2 requests server 1132 to verify the validity of the captured graphic code. The request is received by server 1132 and stored in memory 1272. At step 1307, server 1132 is configured to send a confirmation that the captured graphic code is valid and that the communication with the other mobile computing device 1104-1 can be established, otherwise a message error can be provided. As a result, mobile computing device 1104-2 is configured to execute a messaging application 1208 to communicate with the other mobile computing device 1104-1. In particular, upon confirmation that the graphic code is verified (step 1307), the mobile computing device 1104-2 is enabled to initiate and establish an online exchange of messages in real time, e.g. a so-called chat or electronic chat, with the other mobile computing device 1104-1. According to some embodiments, initiating and establishing the chat may include login into the application, e.g. by using the account login credentials previously mentioned above. For example, upon signing in, the mobile computing device 1104-2 can be enabled to join a so-called chat room with the other mobile computing device 1104-1.

The nature of the association request of step 1301 is not particularly limited, but generally allows server 1132 to identify mobile computing device 1104-1 and to match the association request with the verification request of step 1305. In other words, the verification requests at steps 1305 and association request 1301 signal to server 1132 that mobile device 1104-1 and mobile device 1104-2 both wish to create an association between them in order to trigger executing messaging application 1208 on both mobile device 1104-1 and mobile device 1104-2 and thus initiate communication as above described.

At step 1315, server 1132, executing authentication application 1276, matches the requests and string received at steps 1301 and 1305. Other validation steps can also be carried out, but are not required. In general, server 1132 is configured to match the verification request and the association request. If the verification request received at step 1305 matches an earlier association request, the matching is successful. If the association request does not match any verification requests stored in memory 1272, the matching fails and server 1132 is configured to return an error message to mobile device 1104-2. In practice, server 1132 may receive a large number of codes in response to a number of requests from different mobile devices. Thus, the performance of step 1315 generally involves search memory 1272 for a code matching the contents of the association request. If a match is found, an association will be created between mobile computing device 1104-1 and the mobile computing device 1104-2 devices whose IP address (or other identifier) is stored in memory 1272 in connection with the matching code.

Continuing with description of embodiments of method 1300 using FIG. 12, server 1132 is also configured, at step 1325, to send a connection instruction to messaging server 1116. The connection instruction informs messaging server 1116 of the successful association of mobile computing device 1104-1 and mobile computing device 1104-2, and thus includes identifiers of both those devices. Messaging server 1116 receives the connection instruction and, at step 1328, updates database 1266 to store an identifier of mobile computing device 1104-2 in connection with an identifier of mobile computing device 1104-1. The nature of the identifiers is not particularly limited, and multiple identifiers of each device can be stored in database 1266 in connection with each other. For example, at step 1328 messaging server 1116 can create or update a record in database 1266 to include the account name associated with mobile computing device 1104-2, the IP address of mobile computing device 1104-2, and the IP address of mobile computing device 1104-1.

Following the completion of step 1328, an association has been established between mobile computing device 1104-1 and mobile computing device 1104-2.

Messaging server 1116 can send a message (not shown) to mobile computing device 1104-1 and/or mobile computing device 1104-2 confirming that the association has been established.

Once the association is established, mobile computing device 1104-1, messaging server 1116 and mobile computing device 1104-2 are configured to interact to exchange instant messages via messaging application 1208 on corresponding displays 1216.

Figure 15:
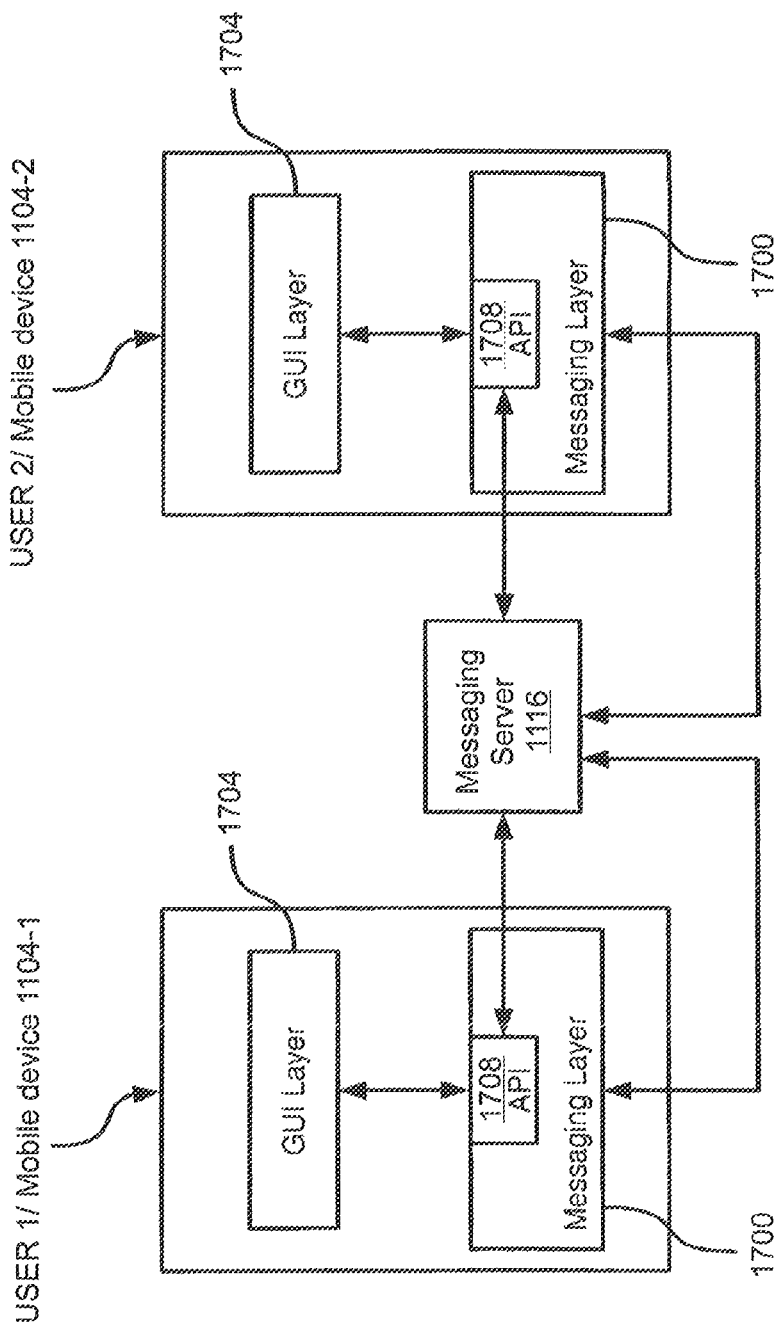
FIG. 15 shows a schematic diagram of the messaging application of FIG. 11, according to embodiments of the present disclosure.

Referring briefly to FIG. 15, a diagram of messaging applications 1208 of mobile computing devices 1104-1 and 1104-2 of respectively user 1 and user 2 when used for exchanging instant messages is described.

Messaging application 1208 can have a messaging layer 1700 and a GUI layer 1704. Messaging layer 1700 can configure processor 1200 to receive, process and generate messages for communication with other mobile computing devices 1104. GUI layer 1704, meanwhile, can configure processor 1200 to control display 1216 to present data received, processed and generated by messaging layer 1700. In addition, messaging layer can include an application programming interface (API) component 1708 for communicating with GUI layer 1704. For example, API 1708 can define the form and contents of instructions generated by messaging layer 1700 for use by GUI layer 1704 in controlling display 1216.

In regular use (that is, when instant messaging exchange is being conducted), executing messaging application 1208 on mobile computing device 1104-1 causes messaging layer 1700 to pass data to GUI layer 1704 for drawing on display 1216, and also causes GUI layer 1704 to pass data representing user input to messaging layer 1700 for generation and transmission of a message to mobile computing device 1104-2.

Returning to FIG. 12, mobile computing device 1104-2 is configured to receive input at step 1329 from, for example, input device, such as touchscreen 1212 or a keyboard, where provided, in connection with messaging interface 1209 of the messaging application 1208. Such input can be a selection of an account identifier 1210, the composition of a message, and the like. Composition of a message to the account identifier related to user 2 of mobile computing device 1104-2 can generate message data to be delivered to mobile computing device 1104-1.

According to FIG. 12, upon receiving input at step 1329, then at step 1330 mobile computing device 1104-2 is configured to transmit message data to messaging server 1116 for delivery to mobile computing device 1104-1 at step 1335.

Steps 1330 and 1335 can be implemented in a variety of ways. For example, mobile computing device 1104-2 can be configured to transmit message data in a communication addressed to mobile computing device 1104-1. In another example, mobile computing device 1104-2 can be configured to transmit the message data without an address, and messaging server 1116 can be configured to determine, based on the updated contents of database 1266 and on the nature of the message data, that the message data should be forwarded to mobile computing device 1104-1. Other implementations will also occur to those skilled in the art.

Referring again to FIG. 12, at step 1340 mobile computing device 1104-1 is configured to present an updated GUI, using generated GUI output data according to the message data received from messaging server 1116.

Both mobile computing device 1104-1 and mobile computing device 1104-2 can use respective messaging interface 1209 of the messaging application 1208 to manage the instant messaging exchange (see e.g. FIG. 15). A messaging interface 1209 can be generated on any of mobile computing devices 1104 by a GUI layer 1704 as will be described in greater detail below.

Messaging interface 1209 may include identifiers 1210 of various other accounts (associated with other mobile computing devices 1104), each of which is selectable to cause the display of recently exchanged messages with the selected account. It is contemplated that messaging interface 1209 presented at mobile computing device 1104-2 need not be identical to a messaging interface 1209 presented at mobile computing device 1104-1.

At step 1345, mobile computing device 1104-1 is configured to receive input from, for example, input device, such as touchscreen 1212 or a keyboard, where provided, in connection with messaging interface 1209 of the messaging application 1208. Such input can be a selection of an account identifier 1210, the composition of a message, and the like. Composition of a message to the account identifier related to user 1 of mobile computing device 1104-1 can generate message data to be delivered to mobile computing device 1104-2.

At step 1350, mobile computing device 1104-1 is configured to transmit the message data to messaging server 1116, for delivery to mobile computing device 1104-2 at step 1355. As with steps 1330 and 1335, the exact implementation of steps 1350 and 1355 is not particularly limited. In some examples, mobile computing device 1104-1 can explicitly address the message data to mobile computing device 1104-2, while in other examples it can be left to messaging server 1116 to determine, based on database 1266, where to send the message data.

Following receipt of the message data at mobile computing device 1104-2 at step 1355, the message data is processed (specifically, by execution of messaging layer 1700) and mobile computing device 1104-2 can exchange message data with messaging server 1116. Depending on the nature of the message data, mobile computing device 1104-2 can be configured to generate message data for delivery to another mobile computing device and send the message data, returning at step 1330.

At step 1360 mobile computing device 1104-2 is configured to present an updated GUI, using generated GUI output data according to the message data received from messaging server 1116 at step 1355.

It will be apparent from the above that message data can also be received, unsolicited, at mobile computing device 1104-1 or at mobile computing device 1104-2 from messaging server 1116. For example, when mobile computing device 1104-1 sends a message addressed to mobile computing device 1104-2 at step 1350, messaging server 1116 transmits the message to mobile computing device 1104-2 at step 1355.

To summarize, once the connection between mobile computing device 1104-1 and mobile computing device 1104-2 is established, messaging server 1116 is configured to route message data between mobile computing device 1104-1 and mobile computing device 1104-2.

The performance of steps 1329-1355 can be repeated for as long as communication via instant messaging exchange is desirable.

Figure 17:
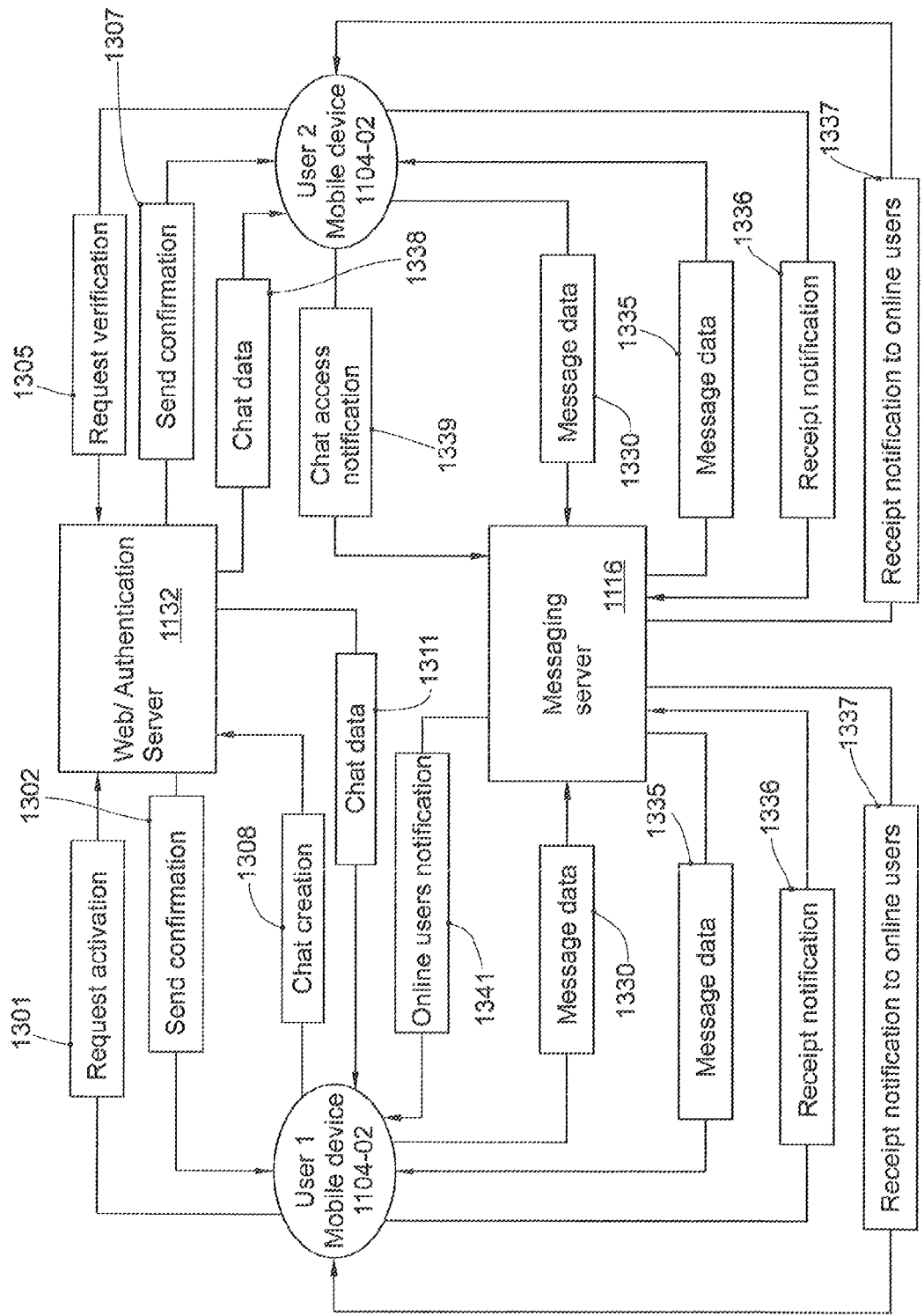
FIG. 17 shows a method and system for initiating and establishing a communication between mobile computing devices according to embodiments of the present disclosure.

FIG. 17 is used to describe embodiments of method 1300 according to the present disclosure, which can be combined with all embodiments described herein, for establishing and initiating communication between user 1, using mobile computing device 1104-1, and user 2, using mobile computing device 1104-2.

According to the present disclosure, user 1, wishing to make available a code 1508 that can be used by user 2 to initiate and establish an instant messaging exchange communication, executes step 1301 to activate code 1508. Step 1301 can be executed by capturing code 1508 using mobile computing device 1104-1 (see FIG. 14). The code 1508 encodes a univocal URI string obtained according to the present disclosure with reference to embodiments described using FIGS. 1 to 9 as for instance described in above paragraph GENERATION OF SERIES OF GRAPHIC CODES, e.g. QR CODES, AND UNIVOCAL SECURITY CODES.

In particular, mobile computing device 1104-1 of user 1 captures code 1508 and then contacts the server 1132 to verify validity of the code 508 and to activate associated to (step 1301).

If server 112 establishes that the code 1508 is valid, a confirmation is sent to mobile computing device 1104-1 (step 1302), then user 1 can create a chat to exchange instant messages with another user receiving or acquiring code 1508, e.g. user 2, (see step 1308).

In particular, at step 1308, messaging application 1208 can also require user 1 to enter login credentials. Then messaging application 1208 of mobile computing device 1104-1 is configured to enable user 1 to customize the instant messaging exchange communication, or chat, i.e. assign a name or title to the created chat, manage privacy policy and for instance to assign a picture to the chat. User 1 can decide to set the specific chat as a private chat which can be joined by user 2 only upon entering a univocal security code 1510. A univocal security code 1510 can be set by user 1 or by the server 1132 and then provided to user 2.

Upon user 1 signing into messaging application 1208, and possibly chat customization, server 1132 replies by sending the specific chat data to mobile computing device 1104-1 (step 1311). The messaging application 1208 installed in the mobile computing device 1104-1 can be configured to display and manage the chat/message data. Message/chat data can be used by the messaging application 1208 to populate a list of available user's chat as above described. Such list can be displayed by the messaging application 1208 (see e.g. FIG. 16).

According embodiments described using FIG. 17, once a code 1508 is activated for instance by user 1, any enabled user may access, according to embodiments described herein, the instant messaging exchange communication (i.e. chat) associated therewith. Initiating and establishing the instant messaging exchange communication by user 2 can simply be triggered by the mobile computing device 1104-2 capturing code 1508 (see e.g. FIG. 14) and then decoding the URI string contained therein and possibly providing the univocal security code 1510. In this way, instant messaging exchange communication can be initiated and established as seamlessly as possible, to and from each computing device so that the computing devices can be simply connected irrespective of how the connection is achieved.

For instance, user 2 may initially obtain access to the specific chat by capturing, using the mobile computing device 1104-2, the code 1508 activated by user 1. Step 1305 is performed to verify that code 1508 is valid and, upon verification (step 1307), server 1132 is configured to send to mobile computing device 1104-2 all the chat data (step 1338). In possible implementations, a user wishing to join the chat associated with the specific captured code 1508 may be requested to enter the univocal security code 1510 if provided. For example, if the chat is set as a private chat e.g. by user 1, then user 2 is requested to enter the univocal security code 1510 to join the specific chat. Since user 2, in order to capture code 1508, shall be in close proximity with code 1508, or with the item 1509 or user/person wearing or bearing the code 1508, also the security code 1510 can be easily known or retrieved by user 2.

Once the instant messaging exchange communication (i.e. chat) is established and initiated as above described, any of the users enabled to use the specific chat can at any time access the chat and a presence notification is sent by messaging server 1116 to all the users (steps 1339 and 1341).

For instance, when user 2 enters the chat, mobile computing device 1104-2 is configured to send a presence notification message to messaging server 1116 (step 1339). Moreover, at step 1339 mobile computing device 1104-2 can be configured to download, from messaging server 1116, all the unread messages of the chat and/or, for instance in case that the received message is the first unread message, the chat history, i.e. the last messages exchanged in the specific chat, e.g. the last 100 messages.

At step 1341, a broadcast notification message communication is made by messaging server 1116 in consequence of chat access notification of step 1339. In particular, at step 1341 messaging server 1116 is configured to notify all the users online that another user, in this case for instance user 2, has joined the specific chat.

According to the method and system described using FIG. 17, user 1 can send an instant messaging to mobile computing device 1104-2 of user 2 using messaging application 1208 of mobile computing device 1104-2. Message is first sent to messaging server 1116 (step 1330) and then messaging server 1116 forwards message to mobile computing device 1104-2 of user 2 (step 1335). Upon receiving message at step 1335, mobile computing device 1104-2 can be configured to send a notification message to confirm message receipt. Notification message can be sent to and received by the messaging server 1116 (step 1336 of FIG. 17). Then, messaging server 1116 is configured to send notification message to confirm receipt to all the users online (step 1337 of FIG. 17). Moreover, mobile computing device 1104-2 of user 2 can send a message to mobile computing device 1104-1 of user 1 and/or reply to the message received by mobile computing device 1104-1 essentially by replicating the above procedure following steps 1330, 1335, 1336, 1337.

According to possible advantageous embodiments, which can be combined with all embodiments described herein, users wishing to access an instant messaging exchange communication according to the present disclosure can be anonymous, since there is no need to share or provide their own personal details or information, such as real name, cellular phone number and the like.

In possible implementations, routing communications and messages between mobile computing devices 1104-1, 1104-2, 1104-3 may imply that the messaging server 1116 is configured to store the messages in memory 1262. Storing messages in memory 1262 can be temporary. According to possible advantageous embodiments, which can be combined with all embodiments described herein, messaging server 1116 can be configured to only route communications and messages between mobile computing devices 1104-1, 1104-2, 1104-3 but not to maintain such data stored in memory 1262. In other words, once a message is routed by messaging server 1116 to the receiving mobile computing devices 1104-1, 1104-2, 1104-3, the message is deleted from memory 1262 of messaging server 1116. This aspect may enhance safety and privacy of the communication.

In other possible implementations, the messaging server 1116 may be configured to route communications and messages between mobile computing devices 1104-1, 1104-2, 1104-3 without storing the messages in memory 1262. This aspect may further enhance safety and privacy of the communication.

Variations to the above may also be contemplated. For example, messaging server 1116 and server 1132 can be co-located, or even combined into a single server. In other embodiments, web server application 1274 and authentication application 1276 need not both be executed by server 1132. For example, server 1132 may execute only web server application 1274, and authentication functionality obtained by the execution of authentication application 1276 can be relocated to messaging server 1116. In other words, the functionality provided by the three server applications—routing application 1264, web server application 1274 and authentication application 1276—can be arranged at one or more servers in any of a variety of combinations.

In some variations, the connections between mobile device 1104-1 and messaging server 1116, and between messaging server 1116 and mobile device 1104-2 (or indeed any other mobile devices 1104) can be encrypted.

In another variation, communications between mobile device 1104-1 and mobile device 1104-2 can be encrypted end-to-end such that no intermediate element (including messaging server 1116) can view the content of those communications. In this variation, messaging server 1116 does not maintain persistent associations between addressee identifiers and unique device identifiers as in database 1266 mentioned above. Instead, in this end-to-end encryption, messaging server 1116 maintains only session-specific associations. Messaging server 1116 can, however, store session-based data tracking current connections. In the end-to-end encryption variation, authentication application 1276 is not envisaged. Rather, mobile device 1104-1 and mobile device 1104-2, in general mobile devices 1140, themselves handle authentication and connection setup. Moreover, in this variation, server 1132 does not perform any authentication functions.

According to possible implementations, when user 2 joins chat with user 1 via capturing code 1508 as above described, no other user is allowed to join the same chat. In other words, a further user, e.g. user 3, capturing the same code 1508 already captured by user 2, will be denied joining the chat. Any attempt made by user 3 to access the specific URI will then be bounced by server 1132. Server 1132 manages the requests to join the chat via step 1315 described with reference to FIG. 12 in order to avoid that a third user joins a chat already joined by two other users (i.e. the user providing the code 1508 and the user capturing the code 1508).

In other possible implementations, a group chat can be created allowing more than two users to join the same chat. Also in this case server 1132 manages the requests in order to create the group chat.

In another variation, messaging server 1116 can determine, for example based on the IP addresses associated with mobile computing device 1104-1 and mobile computing device 1104-2, that mobile computing device 1104-1 and mobile computing device 1104-2 appear to be on the same local network. Messaging server 1116 can be configured to inform one or both devices of that fact, following which either or both of mobile computing device 1104-1 and mobile computing device 1104-2 can be configured to attempt to establish a local encrypted connection with each other, bypassing messaging server 1116. In still another variation, either or both of mobile computing device 1104-1 and mobile computing device 1104-2 can be configured to attempt to contact one another directly on a local network. If both devices are in fact on the same local network, message data can be transmitted between the devices without the involvement of messaging server 1116.

According to further embodiments, combinable with all embodiments described herein, the method according to the present disclosure may further comprise establishing a real time voice and/or video communication over Internet Protocol (IP) networks, i.e. via Internet telephony, e.g. using VoIP (Voice over Internet Protocol, Voice over IP, or IP telephony) between the 1104-1 and the second mobile computing device 1104-2 or in general other mobile computing devices 1104.

VoIP is a methodology and group of technologies for the delivery of voice communications and multimedia sessions over Internet Protocol (IP) networks, such as the Internet. The terms Internet telephony, broadband telephony and broadband phone service can be used interchangeably IP telephony to specifically refer to the provisioning of communication services (voice, fax, SMS, voice-messaging) over the public Internet, rather than via public switched telephone network (PSTN).

The system of the present disclosure can be configured for establishing a real time voice and/or video communication over Internet Protocol (IP) networks, i.e. via Internet telephony between the first mobile computing device 1104-1 and the second mobile computing device 1104-2 or in general other mobile computing devices 1104. For example, server 1132 is configured for establishing and managing such Internet telephony (e.g. via VoIP) communication. In other words, the method and system of the present disclosure can be configured for providing voice chat/voice calls capability between the mobile computing devices using Internet telephony.

In further possible embodiments, combinable with all embodiments described herein, method and system according to the present disclosure can be configured for establishing a real time audio/video communication between the 1104-1 and the second mobile computing device 1104-2 or in general other mobile computing devices 1104, e.g. a video chat, for example using H.323 standard (video over IP) or SIP (Session Initiation Protocol) used for Voice over IP calls. Compression standard H.264 can also be used for enabling videoconferencing systems to achieve highly error resilient Internet Protocol (IP) video transmissions over the public Internet without quality-of-service enhanced lines.

Another protocol that can be used in the field of instant messaging for providing video conferencing/chat capability is the Jabber, also known as XMPP (eXtensible Messaging and Presence Protocol), including extensions (XMMP/Jingle) for handling audio/video calling.

For instance, server 1132 can be configured to handle video input, video output, audio input, audio output and data transfer and tie together, performing compressing and decompressing and initiating and maintaining the data linkage via the network.

In other words, the method and system of the present disclosure can be configured for providing videoconferencing and/or video chat and/or video calls capability over the Internet Protocol (IP) between the mobile computing devices, e.g. for implementing videoconferences carried out via dispersed mobile devices also known as e-meetings.

System and method and apparatus for establishing a communication between mobile computing devices according to embodiments described herein can be used for consumer-to-consumer communication purposes and/or for social media purposes.

Moreover, system and method and apparatus for establishing a communication between mobile computing devices according to embodiments described herein can be used for business-to-consumer communication purposes. For instance, a graphic code according to the present disclosure can be associated to a service or good and a client or consumer can access customized chat related with the specific service or good with a dedicated personal assistant or customer-care assistance of the business company offering/providing the service and/or selling the good.

Some embodiments can provide to execute various steps, passages and operations as described above. The steps, passages and operations can be made with instructions performed by a machine, which cause certain steps to be executed by a general-purpose or special-purpose processor. Alternatively, the steps, passages and operations can be executed by specific hardware components that contain hardware logic to execute the steps, or by any combination whatsoever of components for programmed computers and personalized hardware components.

Some embodiments of the method according to the present description can be included in a computer program storable in a mean readable by a computer that contains the instructions which, once executed by the apparatus 150, determine the execution of the method according to embodiments.

In particular, elements according to the present disclosure can be supplied as means readable by a machine to store the instructions that can be executed by the machine. The machine-readable means can include, without being limited to, floppy disks, optical discs, CD-ROM, and magneto-optical discs, ROM, RAM, EPROM, EEPROM, optical or magnetic boards, propagation means or other types of machine-readable means suitable to store electronic information. For example, embodiments can be downloaded as a computer program which can be transferred from a remote computer (for example a server) to a computer making a request (for example client), by data signals achieved with carrier waves or other propagation means, via a communication connection (for example a modem or a network connection).

It is clear that modifications and/or additions of parts and/or steps may be made to the method and system for initiating and establishing a communication between mobile computing devices as described heretofore, without departing from the field and scope of the present disclosure.

It is also clear that, although the present disclosure has been described with reference to some specific examples, a person of skill in the art shall certainly be able to achieve many other equivalent forms of method and system for initiating and establishing a communication between mobile computing devices, having the features as set forth in the claims and hence all coming within the field of protection defined thereby.

The invention claimed is:

1. A method for establishing a communication between mobile computing devices, the method comprising:
    providing, on a physical or virtual substrate, and separately from a first and a second mobile computing devices, a graphic code encoding a univocal Uniform Resource Identifier (URI) string;
    capturing the graphic code by the first mobile computing device to activate said graphic code, wherein activation of the graphic code establishes that the resource over the network corresponding to said Uniform Resource Identifier (URI) string is available for instant messaging exchange communication between said first mobile computing device and another mobile computing device;
    capturing the graphic code and decoding the string contained in said graphic code by the second mobile computing device, disposed remotely from the first mobile computing device;
    in response to capturing the graphic code and decoding the string contained in said graphic code by the second mobile computing device, initiating and establishing an instant messaging exchange communication between the first mobile computing device and the second mobile computing device at the specific Uniform Resource Identifier (URI).

2. The method of claim 1, wherein providing a graphic code encoding a univocal Uniform Resource Identifier (URI) string comprises:
    defining a quantity n of a series of graphic codes to be generated;
    generating x Uniform Resource Identifier (URI) strings, until x=n, wherein the generation of the Uniform Resource Identifier (URI) strings provides to generate a string with a length of m pseudo-random alphanumerical characters, with a cycle repeated m times, which calculates the remainder of the division between a random number and the length m of the string and uses it as an indicator to find the alphanumerical character;
    verifying the univocity of each of the x Uniform Resource Identifier (URI) strings generated, by comparing them with Uniform Resource Identifier (URI) strings in a list of Uniform Resource Identifier (URI) strings;
    generating n graphic codes, each encoding the x=n Uniform Resource Identifier (URI) strings generated and verified as univocal;
    wherein, if a Uniform Resource Identifier (URI) string is univocal, it is stored in a database which comprises said list of Uniform Resource Identifier (URI) strings, a counter variable x is increased until x=n and the number at least of Uniform Resource Identifier (URI) strings corresponds to the value n of graphic codes of the series to be generated;
    assigning a specific generated and univocal Uniform Resource Identifier (URI) string to a single specific accredited mobile computing device.

3. The method of claim 1, wherein said instant messaging exchange communication is set as a private communication requiring a univocal security code for joining it.

4. The method of claim 3, wherein said method comprises generating at least one univocal security code for each graphic code, the univocal security code being required for the second mobile computing device, after capturing the graphic code and decoding the string contained in said graphic code, to join the instant messaging exchange communication with the first mobile communication device.

5. The method of claim 1, wherein the Uniform Resource Identifier (URI) string is a URL address.

6. The method of claim 1, wherein the Uniform Resource Identifier (URI) string is a URN strings.

7. The method of claim 1, wherein the graphic code is a QR-code.

8. The method of claim 1, wherein the graphic code is portable.

9. The method of claim 1, wherein the substrate is physical.

10. The method of claim 1, wherein the substrate is virtual.

11. The method of claim 1, wherein messages between mobile communication devices are routed via a messaging server.

12. The method of claim 11, wherein messages between mobile communication devices routed via the messaging server are deleted from the messaging server.

13. The method of claim 1, wherein the instant messaging exchange communication between mobile communication devices is encrypted.

14. The method of claim 1, wherein the graphic code is configured to point to a dynamic content at said Uniform Resource Identifier (URI), the dynamic content including data messages.

15. The method of claim 1, wherein the method further comprises establishing a real time voice and/or video communication over Internet Protocol (IP) networks between the first mobile computing device and the second mobile computing device.

16. A method for establishing a communication between mobile computing devices, the method comprising:
    providing a graphic code encoding a univocal Uniform Resource Identifier (URI) string, the graphic code being configured to establish that the resource over the network corresponding to said Uniform Resource Identifier (URI) string is available for instant messaging exchange communication between a first mobile computing device and another mobile computing device, including receiving an activation request for the graphic code from the first mobile computing device, over a communication network;

capturing the graphic code and decoding the string contained in said graphic code by a second mobile computing device disposed remotely from the first mobile computing device;

capturing the graphic code and decoding the string contained in said graphic code by the second mobile computing device, initiating and establishing an instant messaging exchange communication between the first mobile computing device and the second mobile computing device at the specific Uniform Resource Identifier (URI), including transmitting a connection instruction to a messaging server over the communication network.

17. A system for establishing a communication between mobile computing devices, the system comprising:

a physical or virtual substrate with one or more graphic code encoding a univocal Uniform Resource Identifier (URI) string, the substrate provided separately from a first and a second mobile devices;

the first mobile computing device configured to capture the graphic code to activate said graphic code, wherein activation of the graphic code establishes that the resource over the network corresponding to said Uniform Resource Identifier (URI) string is available for instant messaging exchange communication between said first mobile computing device and another mobile computing device;

the second mobile computing device, disposed remotely from the first mobile computing device, configured to capture the graphic code and decode the string contained in said graphic code;

a web/authentication server configured to manage initiating and establishing an instant messaging exchange communication between the first mobile computing device and the second mobile computing device at the specific Uniform Resource Identifier (URI) upon capturing the graphic code and decoding the string contained in said graphic code by the second mobile computing device;

a messaging server configured to at least route messages between the first mobile computing device and the second mobile computing device.

18. The system of claim 17, wherein the system is further configured for establishing a real time voice and/or video communication over Internet Protocol (IP) networks between the first mobile computing device and the second mobile computing device.

19. A system for establishing a communication between mobile computing devices, the system comprising:

one or more graphic code encoding a univocal Uniform Resource Identifier (URI) string, the graphic code provided on a physical or virtual substrate separately from a first and a second mobile computing devices and being configured to establish that the resource over the network corresponding to said Uniform Resource Identifier (URI) string is available for instant messaging exchange communication between a first mobile computing device and another mobile computing device;

a second mobile computing device, disposed remotely from the first mobile computing device, configured to capture the graphic code and decode the string contained in said graphic code;

a web/authentication server configured to manage initiating and establishing an instant messaging exchange communication between the first mobile computing device and the second mobile computing device at the specific Uniform Resource Identifier (URI) upon capturing the graphic code and decoding the string contained in said graphic code by the second mobile computing device;

a messaging server configured to at least route messages between the first mobile computing device and the second mobile computing device.

20. A non-transitory computer readable medium including at least computer program code for establishing a communication between mobile computing devices, said computer readable medium comprising:

computer program code for providing, on a virtual substrate separately from a first mobile computing device and a second mobile computing device, a graphic code encoding a univocal Uniform Resource Identifier (URI) string;

computer program code for capturing the graphic code by the first mobile computing device to activate said graphic code, wherein activation of the graphic code establishes that the resource over the network corresponding to said Uniform Resource Identifier (URI) string is available for instant messaging exchange communication between said first mobile computing device and another mobile computing device;

computer program code for capturing the graphic code and decoding the string contained in said graphic code by the second mobile computing device;

computer program code for initiating and establishing an instant messaging exchange communication between the first mobile computing device and the second mobile computing device at the specific Uniform Resource Identifier (URI) in response to capturing the graphic code and decoding the string contained in said graphic code by the second mobile computing device.

21. The non-transitory computer readable of claim 20, wherein said computer readable medium further comprises:

computer program code for managing initiating and establishing an instant messaging exchange communication between the first mobile computing device and the second mobile computing device at the specific Uniform Resource Identifier (URI) upon capturing the graphic code and decoding the string contained in said graphic code by the second mobile computing device;

computer program code for at least routing messages between the first mobile computing device and the second mobile computing device.

22. The non-transitory computer readable of claim 20, wherein said computer readable further comprises:

computer program code for establishing a real time voice and/or video communication over Internet Protocol (IP) networks between the first mobile computing device and the second mobile computing device.

23. A non-transitory computer readable medium including at least computer program code for establishing a communication between mobile computing devices, said computer readable medium comprising:

computer program code for providing a graphic code encoding a univocal Uniform Resource Identifier (URI) string, the graphic code being configured to establish that the resource over the network corresponding to said Uniform Resource Identifier (URI) string is available for instant messaging exchange communication between a first mobile computing device and another mobile computing device, including receiving an activation request for the graphic code from the first mobile computing device, over a communication network;

computer program code for capturing the graphic code and decoding the string contained in said graphic code by a second mobile computing device disposed remotely from the first mobile computing device;

computer program code for triggering initiating and establishing an instant messaging exchange communication between the first mobile computing device and the second mobile computing device at the specific Uniform Resource Identifier (URI) upon capturing the graphic code and decoding the string contained in said graphic code by the second mobile computing device, including transmitting a connection instruction to a messaging server over the communication network.

24. The non-transitory computer readable of claim 23, wherein said computer readable medium further comprises:

computer program code for managing initiating and establishing an instant messaging exchange communication between the first mobile computing device and the second mobile computing device at the specific Uniform Resource Identifier (URI) upon capturing the graphic code and decoding the string contained in said graphic code by the second mobile computing device;

computer program code for at least routing messages between the first mobile computing device and the second mobile computing device.

25. The non-transitory computer readable of claim 23, wherein said computer readable further comprises:

computer program code for establishing a real time voice and/or video communication over Internet Protocol (IP) networks between the first mobile computing device and the second mobile computing device.

\* \* \* \* \*